US012208508B2

(12) United States Patent
Noma et al.

(10) Patent No.: US 12,208,508 B2
(45) Date of Patent: Jan. 28, 2025

(54) INFORMATION PROCESSING DEVICE AND INFORMATION PROCESSING METHOD

(71) Applicant: SONY GROUP CORPORATION, Tokyo (JP)

(72) Inventors: Hideki Noma, Tokyo (JP); Yusuke Kawabe, Tokyo (JP); Junichiro Misawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 281 days.

(21) Appl. No.: 17/757,750

(22) PCT Filed: Dec. 16, 2020

(86) PCT No.: PCT/JP2020/046944
§ 371 (c)(1),
(2) Date: Jun. 20, 2022

(87) PCT Pub. No.: WO2021/131959
PCT Pub. Date: Jul. 1, 2021

(65) Prior Publication Data
US 2023/0028871 A1 Jan. 26, 2023

(30) Foreign Application Priority Data

Dec. 27, 2019 (JP) .................. 2019-239052

(51) Int. Cl.
B25J 11/00 (2006.01)
B25J 9/00 (2006.01)
(Continued)

(52) U.S. Cl.
CPC ........... *B25J 11/001* (2013.01); *B25J 9/0003* (2013.01); *G05D 1/0088* (2013.01); *A63H 3/28* (2013.01); *A63H 11/00* (2013.01); *A63H 2200/00* (2013.01)

(58) Field of Classification Search
CPC ..... B25J 11/001; B25J 9/0003; G05D 1/0088; A63H 3/28; A63H 2200/00; A63H 33/005; A63H 11/00
See application file for complete search history.

(56) References Cited

U.S. PATENT DOCUMENTS 9,423,795 B2 * 8/2016 Araki ................. B60L 3/00
10,780,578 B2 * 9/2020 Blankespoor ............ B25J 5/007
(Continued)

FOREIGN PATENT DOCUMENTS

AU 2013101545 A4 1/2014
CN 101462005 A 6/2009
(Continued)

OTHER PUBLICATIONS

NPL Title: Obstacle avoidance of Inverted pendulum type two wheeled robot by dynamic posture control, by (Wakui). (Year: 2014).*

(Continued)

Primary Examiner — Sohana Tanju Khayer
(74) Attorney, Agent, or Firm — CHIP LAW GROUP

(57) ABSTRACT

There is provided an information processing device that includes an operation controller that controls a moving operation of an autonomous mobile body that travels while maintaining an inverted state, and controls a posture operation of the autonomous mobile body that temporally changes from a reference posture in the inverted state. Furthermore, the information processing device further includes an acquisition unit that acquires motion data corresponding to a posture operation of the autonomous mobile body. The operation controller controls a posture operation of the autonomous mobile body based on the motion data acquired by the acquisition unit.

17 Claims, 26 Drawing Sheets

(51) Int. Cl.
*G05D 1/00* (2006.01)
*A63H 3/28* (2006.01)
*A63H 11/00* (2006.01)

(56) References Cited

U.S. PATENT DOCUMENTS

| | | | |
|---|---|---|---|
| 2002/0068995 | A1 | 6/2002 | Yoshida |
| 2006/0111814 | A1* | 5/2006 | Hachitani ............... G05D 1/027 |
| | | | 700/258 |
| 2015/0202770 | A1* | 7/2015 | Patron .................... G06Q 50/01 |
| | | | 901/50 |
| 2016/0270618 | A1* | 9/2016 | Lu .......................... A47L 9/2805 |
| 2016/0346705 | A1* | 12/2016 | Togawa ................... A63H 3/36 |
| 2019/0126157 | A1* | 5/2019 | Hayashi .................. B25J 5/007 |
| 2020/0368616 | A1* | 11/2020 | Delamont ............ H04N 13/239 |
| 2021/0030498 | A1* | 2/2021 | Peine ...................... A61B 34/74 |
| 2022/0057804 | A1* | 2/2022 | Hasegawa ............ G05D 1/0214 |

FOREIGN PATENT DOCUMENTS

| | | |
|---|---|---|
| CN | 102914293 A | 2/2013 |
| CN | 204193481 U | 3/2015 |
| CN | 107107841 A | 8/2017 |
| CN | 108292816 A | 7/2018 |
| CN | 208049379 U | 11/2018 |
| CN | 110227271 A | 9/2019 |
| EP | 1176572 A2 | 1/2002 |
| GB | 2565959 A | 2/2019 |
| JP | 2002-036158 A | 2/2002 |
| JP | 2012-056001 A | 3/2012 |
| WO | WO-2007035474 A2 | 3/2007 |
| WO | 2019/163312 A1 | 8/2019 |
| WO | WO-2019163279 A1 | 8/2019 |

OTHER PUBLICATIONS

Minatani, et al., "Driving control of Low Center of Gravity Typed Two-Wheeled Mobile Robot for Tour Guide", The Proceedings of Japan Society of Mechanical Engineers annual Conference on Robotics and Mechatronics (Robomec), Jun. 5-8, 2019, 03 pages.
International Search Report and Written Opinion of PCT Application No. PCT/JP2020/046944, issued on Mar. 16, 2021, 10 pages of ISRWO.

* cited by examiner

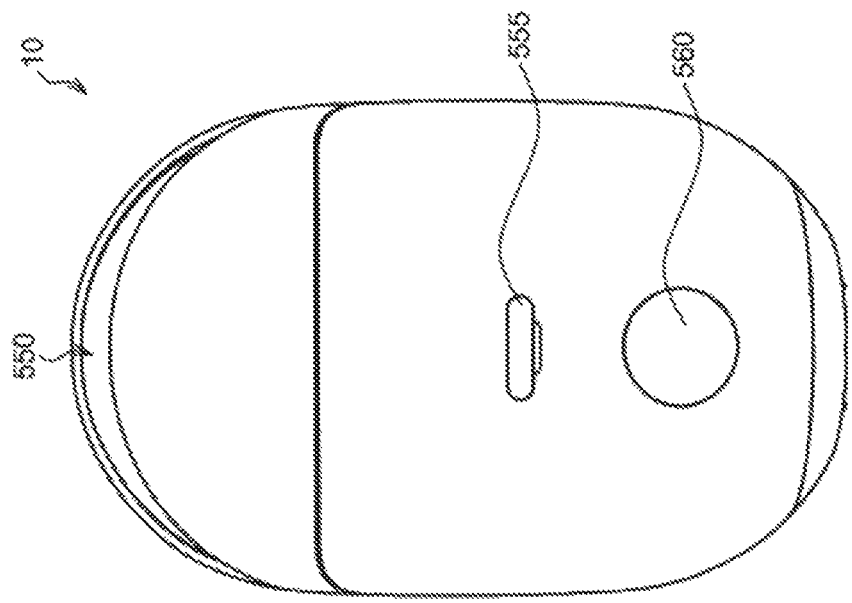
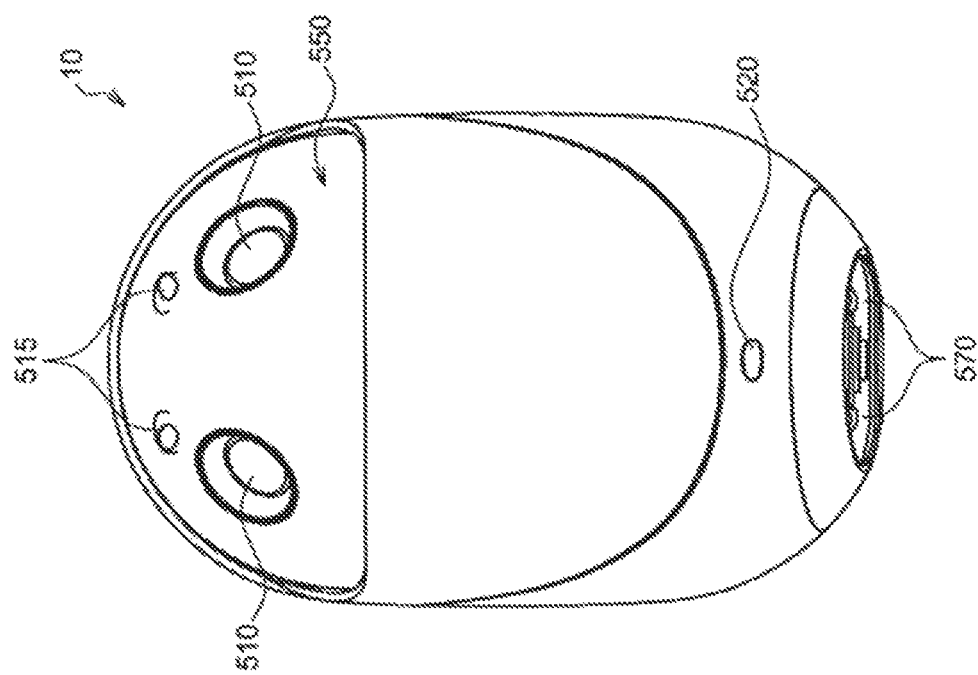
FIG.1

FIG.13B
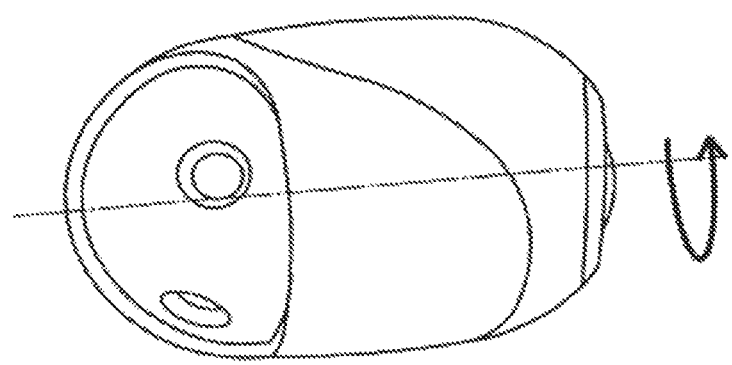
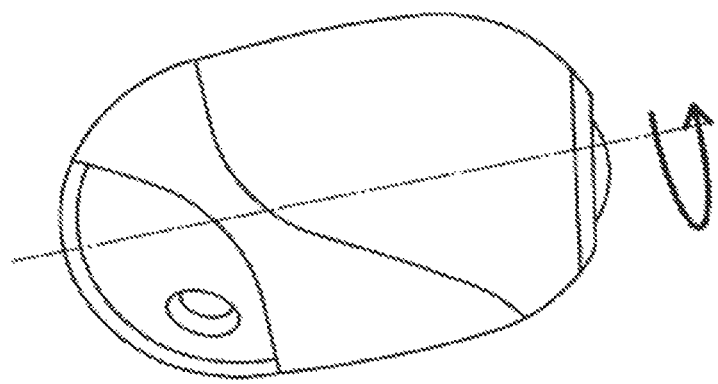
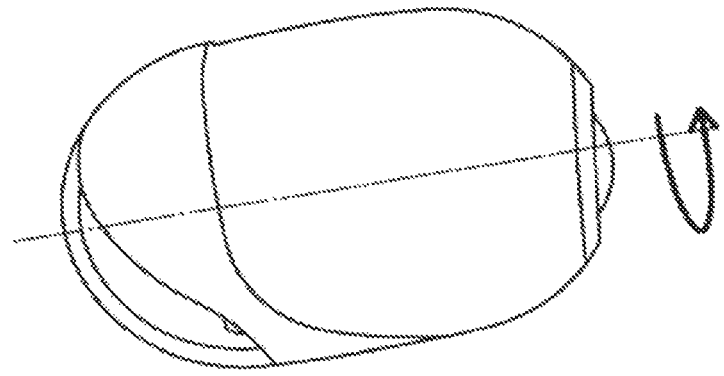

FIG.15

| ENVIRONMENT INFORMATION | ACTION INSTRUCTION | OPERATION ID | ... |
|---|---|---|---|
| DETECT USER'S FACE WITH CAMERA | MOVE STRAIGHT TOWARD USER | M1 | ... |
| DETECT WORD "HAPPY" IN USER'S UTTERANCE | MOVE STRAIGHT TOWARD A DIRECTION FROM WHICH WORD SAYING "HAPPY" IS HEARD | M1 | ... |
| DETECT THAT TEMPERATURE IN BODY OF ROBOT HAS EXCEEDED THRESHOLD VALUE | TURNING MOVEMENT TOWARD USER | M2 | ... |
| DETECT REMAINING BATTERY LEVEL BEING EQUAL TO OR LESS THAN THRESHOLD VALUE | TURNING MOVEMENT TOWARD USER | M2 | ... |
| ... | ... | ... | ... |

FIG.16

| OPERA-TION ID | MEANING | EMOTION | MOTION DATA ID | POSTURE ANGLE | FREQUENCY/TIME | MOTION DATA ||||
|---|---|---|---|---|---|---|---|---|---|
| | | | | | | SET DATA ID | playtime(ms) | ANGLE(°) | |
| M1 | EXPRESSION DURING STRAIGHT MOVEMENT | JOY | M11 | sin WAVE ±3° | 1-3Hz | SD11 | 0 TO 10 | $\theta_{11}$ | ⋮ |
| | | | | | | SD12 | 10 TO 20 | $\theta_{12}$ | ⋮ |
| | | | | | | SD13 | 20 TO 30 | $\theta_{13}$ | ⋮ |
| | | FUN | M12 | sin WAVE ±5° | 1/2-1Hz | ⋮ | ⋮ | ⋮ | ⋮ |
| | | | | | | SD41 | 0 TO 10 | $\theta_{41}$ | ⋮ |
| | ⋮ | ⋮ | ⋮ | ⋮ | ⋮ | ⋮ | ⋮ | ⋮ | ⋮ |
| M2 | REPRESENTATION DURING TURNING MOVEMENT | ANGER | M21 | sin WAVE ±10° | 1-2Hz | SD21 | 0 TO 10 | $\theta_{21}$ | ⋮ |
| | | | | | | SD22 | 10 TO 20 | $\theta_{22}$ | ⋮ |
| | | | | | | SD23 | 20 TO 30 | $\theta_{23}$ | ⋮ |
| | | SADNESS | M22 | sin WAVE ±3° | 5Hz | SD31 | 0 TO 10 | $\theta_{31}$ | ⋮ |
| M3 | EXPRESSION WHEN ROTATING ON THE SPOT | ANGER | M31 | | | | | | ⋮ |
| ⋮ | ⋮ | ⋮ | | | | | | | ⋮ |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/046944 filed on Dec. 16, 2020, which claims priority benefit of Japanese Patent Application No. JP 2019-239052 filed in the Japan Patent Office on Dec. 27, 2019. Each of the above-referenced applications is hereby incorporated herein by reference in its entirety.

FIELD

The present invention relates to an information processing device, an information processing method, and an information processing program.

BACKGROUND

In recent years, autonomous mobile bodies equipped with artificial intelligence, such as robot vacuum cleaners and pet robots in homes and transport robots in factories and distribution warehouses, have been actively developed.

The autonomous mobile body as described above includes an autonomous mobile body that performs a flexible autonomous operation including movement according to a user, a surrounding situation, or its own situation. For example, Patent Literature 1 discloses an autonomous mobile body that performs a moving operation such as a front-back motion, a turning motion, and a rotation motion in a standing state while maintaining a frontward tilting posture.

CITATION LIST

Patent Literature

Patent Literature 1: WO 2019/163312 A

SUMMARY

Technical Problem

However, in the above-described conventional technique, it is not always possible to further enrich the motion expression of the autonomous mobile body. For example, in the above-described conventional technology, the autonomous mobile body only performs a moving operation such as a front-back motion, a turning motion, and a rotation motion in a standing state in which the autonomous mobile body maintains a frontward tilting posture, and it is not always possible to further enrich the motion expression of the autonomous mobile body.

Therefore, the present disclosure proposes an information processing device, an information processing method, and an information processing program capable of further enriching the motion expression of the autonomous mobile body.

Solution to Problem

To solve the above problem, an information processing device comprising:
an operation controller that controls a moving operation of an autonomous mobile body that travels while maintaining an inverted state, and controls a posture operation of the autonomous mobile body that temporally changes from a reference posture in the inverted state.

BRIEF DESCRIPTION OF DRAWINGS

FIG. 1 is a front view and a rear view of an autonomous mobile body according to an embodiment of the present disclosure.

FIG. 13B is a diagram for describing an effect obtained by the frontward tilting motion of the autonomous mobile body 10 according to the embodiment.

FIG. 15 is a diagram illustrating an example of an action storage unit according to the embodiment.

FIG. 16 is a diagram illustrating an example of a motion data storage unit according to the embodiment.

DESCRIPTION OF EMBODIMENTS

Figure 2:
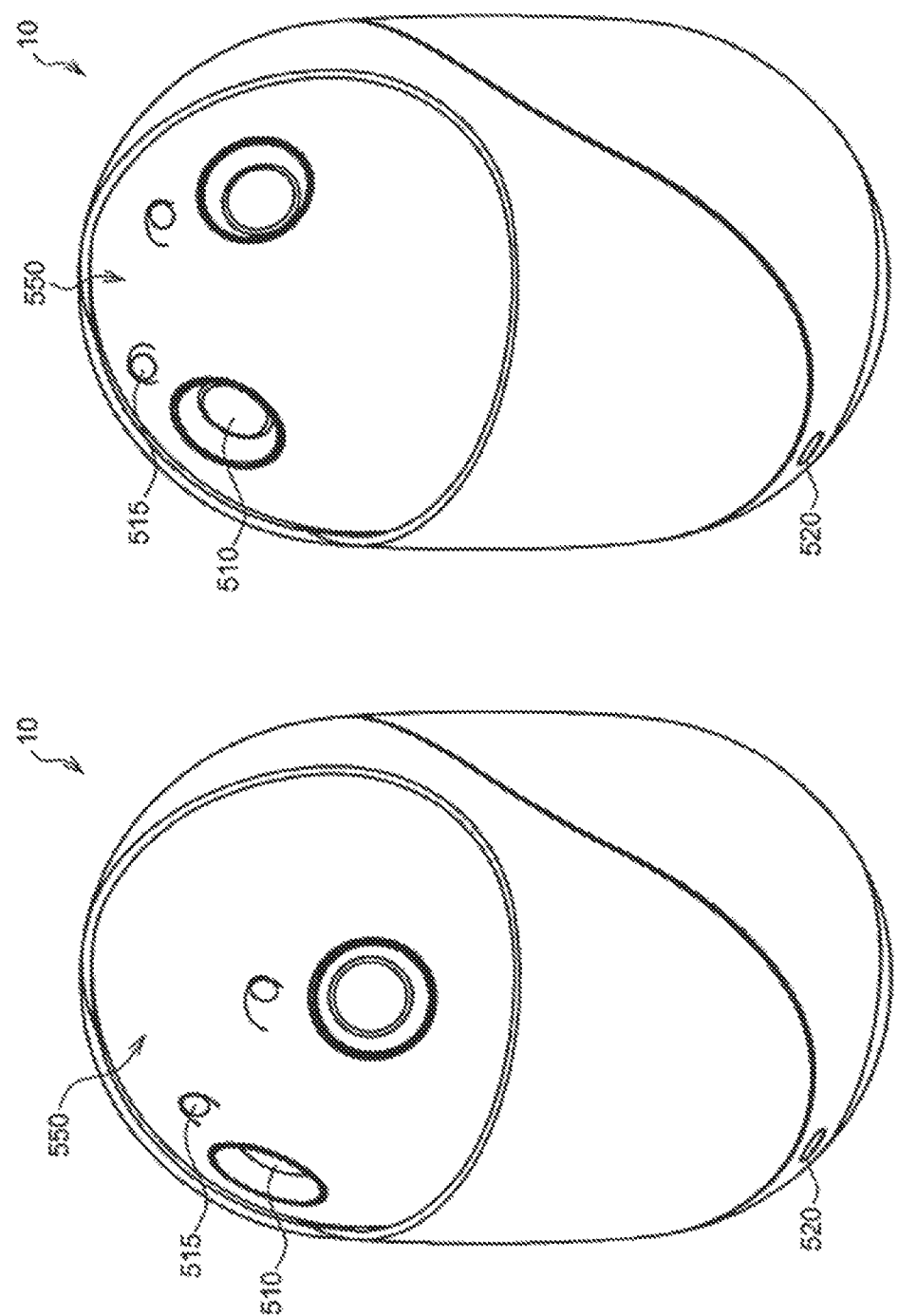
FIG. 2 is a perspective view of the autonomous mobile body according to the embodiment.

Hereinafter, the embodiments of the present disclosure will be described in detail with reference to the drawings. In the following embodiments, the same parts are denoted by the same reference signs, and a duplicate description will be omitted.

The present disclosure will be described in the order of the following items.

The description will be given in the following order.
1. Embodiment
1.1. Overview
1.2. Configuration example of autonomous mobile body 10
1.3. Functional configuration example of autonomous mobile body 10
1.3.1. Details of posture control according to embodiment
1.3.1.1. Motion data expressing joy
1.3.1.2. Motion data expressing fun
1.3.1.3. Motion data expressing anger
1.3.1.4. Motion data expressing sadness
1.3.1.5. Temporal change in angular velocity of wheel in motion data
1.3.1.6. Functional configuration example of operation controller
1.4. Details of other posture control
1.5. Procedure of information processing according to embodiment
1.6. Modification of embodiment
1.6.1. Compatibility of posture angle and rotation angle of wheel
1.6.2. Motion data when softly touched
1.6.3. Motion data expressing confusion (panicking)
1.6.4. Motion data expressing deterioration (feeble)
2. Effects according to the present disclosure
3. Hardware configuration

1. Embodiment

1.1. Overview

First, an outline of an embodiment of the present disclosure will be described. As described above, various robot devices that perform autonomous operations have been developed. For example, Patent Literature 1 discloses an entertainment type robot device having an inverted pendulum structure.

In the related art, for a robot (hereinafter, it is also referred to as an inverted pendulum robot) having an inverted pendulum structure, a control system for maintaining an angle of a posture of the robot at a constant inclination has been constructed in order to maintain a state (hereinafter, it is also referred to as an inverted state) of the inverted pendulum. On the other hand, in an entertainment type robot, it is necessary not only to keep the posture of the robot constant but also to present a change in the posture as an expressive power to the user. Conventional inverted pendulum robots are capable of expressing a change in movement by, for example, changing a moving speed, but are difficult to express a change in movement by changing a posture.

Therefore, an autonomous mobile body 10 according to the embodiment of the present disclosure controls the moving operation of the autonomous mobile body that travels while maintaining the inverted state, and controls the posture operation of the autonomous mobile body 10 that temporally changes from the reference posture in the inverted state. As a result, the autonomous mobile body 10 can simultaneously perform the control of maintaining the inverted state and the control of temporally changing the posture. That is, since the autonomous mobile body 10 can arbitrarily change the posture while maintaining the inverted state, it is possible to show more expressions. For example, the autonomous mobile body 10 can express a posture operation expressing the emotion of the autonomous mobile body 10. Therefore, the autonomous mobile body 10 can further enrich the motion expression of the autonomous mobile body.

1.2. Configuration Example of Autonomous Mobile Body 10

Next, a configuration example of the autonomous mobile body 10 according to an embodiment of the present disclosure will be described. The autonomous mobile body 10 according to the present embodiment can be various devices that perform an autonomous operation based on environment recognition. Hereinafter, a case where the autonomous mobile body 10 according to the present embodiment is an elongated-ellipsoidal agent-type robot device that autonomously travels by wheels will be described as an example. The autonomous mobile body 10 according to the present embodiment realizes various kinds of communication including information presentation, for example, by performing an autonomous operation according to the user, the surroundings, or the situation of the user. The autonomous mobile body 10 according to the present embodiment may be a small robot having such a size and weight that the user can easily lift the autonomous mobile body with one hand.

Figure 3:
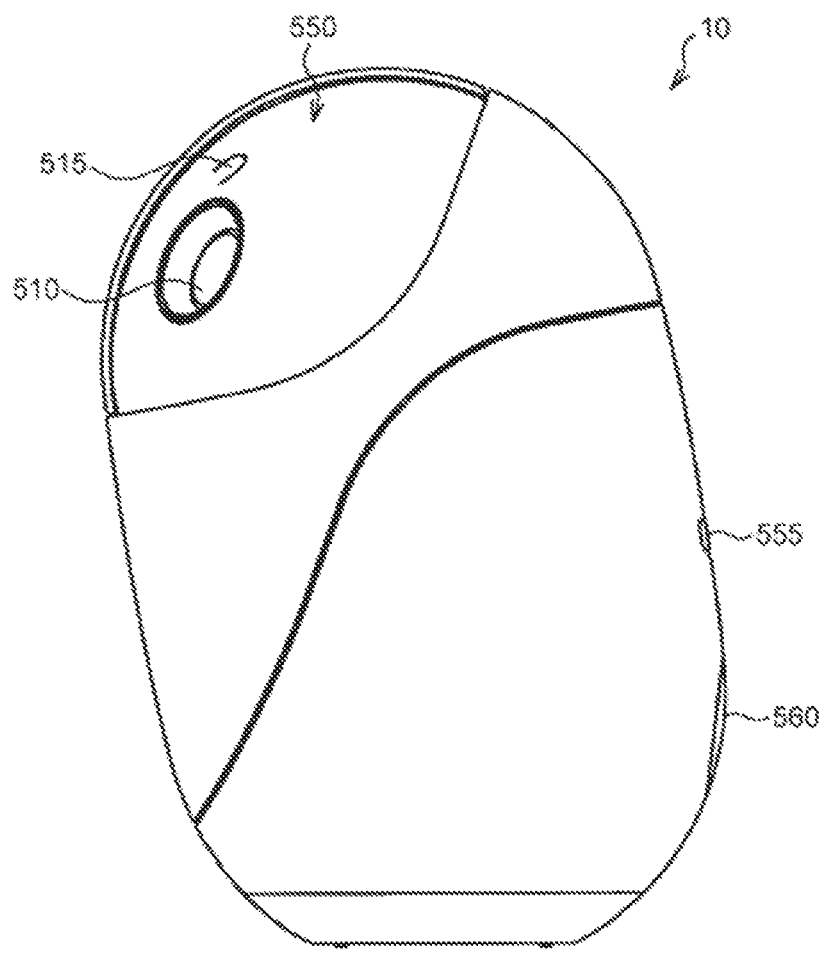
FIG. 3 is a side view of the autonomous mobile body according to the embodiment.
Figure 4:
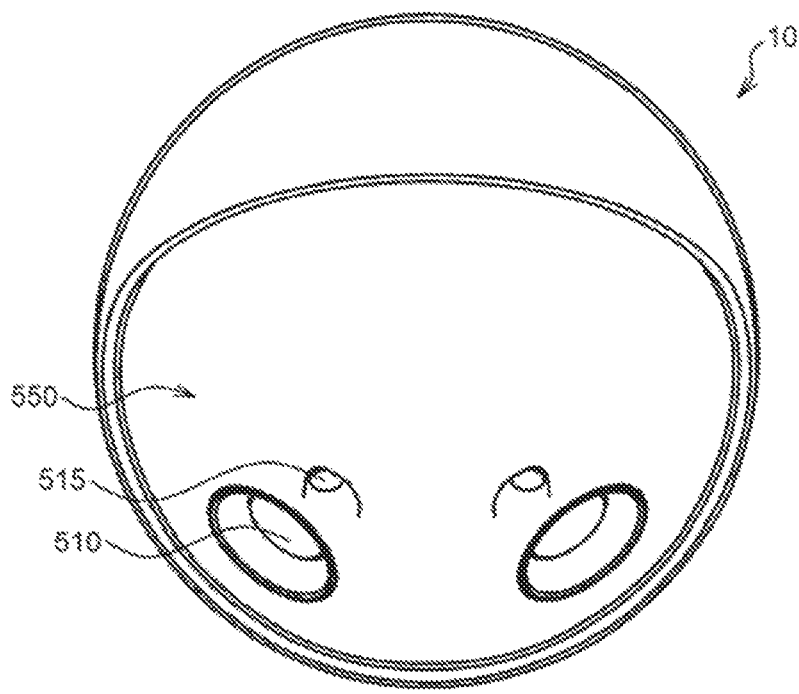
FIG. 4 is a top view of the autonomous mobile body according to the embodiment.
Figure 5:
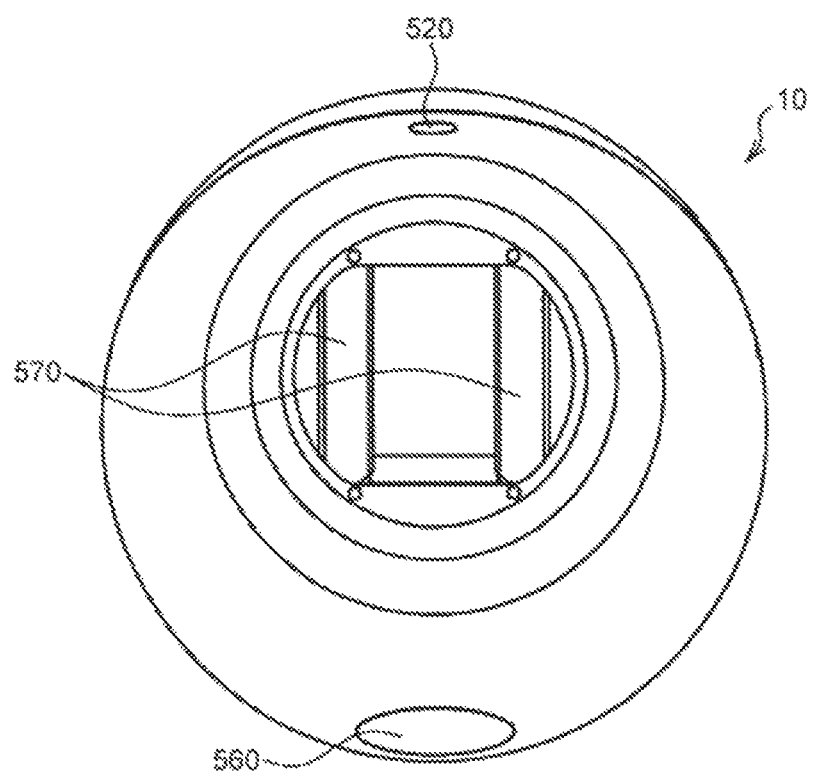
FIG. 5 is a bottom view of the autonomous mobile body according to the embodiment.

First, an example of an exterior of the autonomous mobile body 10 according to the present embodiment will be described with reference to FIGS. 1 to 5. FIG. 1 is a front view and a rear view of the autonomous mobile body 10 according to the present embodiment. FIG. 2 is a perspective view of the autonomous mobile body 10 according to the present embodiment. FIG. 3 is a side view of the autonomous mobile body 10 according to the present embodiment. FIGS. 4 and 5 are a top view and a bottom view, respectively, of the autonomous mobile body 10 according to the present embodiment.

As illustrated in FIGS. 1 to 4, the autonomous mobile body 10 according to the present embodiment includes two eye portions 510 corresponding to a right eye and a left eye in an upper portion of a main body. The eye portion 510 is realized by, for example, an LED or the like, and can express a line of sight, blinks, and the like. Note that the eye portion 510 is not limited to the above example, and may be realized by, for example, a single or two independent organic light emitting diodes (OLEDs).

Furthermore, the autonomous mobile body 10 according to the present embodiment includes two cameras 515 above the eye portions 510. The camera 515 has a function of imaging the user and the surrounding environment. Furthermore, the autonomous mobile body 10 can realize simultaneous localization and mapping (SLAM) based on the image captured by the camera 515.

Note that the eye portion 510 and the camera 515 according to the present embodiment are disposed on a substrate 505 disposed inside the exterior surface. Further, in the present embodiment, the exterior surface of the autonomous mobile body 10 is basically formed using an opaque material, but a head cover 550 made of a transparent or translucent material is provided for a portion corresponding to the substrate 505 on which the eye portion 510 and the camera 515 are disposed. As a result, the user can recognize the eye portion 510 of the autonomous mobile body 10, and the autonomous mobile body 10 can image the outside world.

Furthermore, as illustrated in FIGS. 1, 2, and 5, the autonomous mobile body 10 according to the present embodiment includes a ToF sensor 520 at the front lower portion. The ToF sensor 520 has a function of detecting a distance to an object present ahead. According to the ToF sensor 520, distances to various objects can be detected with high accuracy, and it is possible to prevent falling or falling by detecting a step or the like.

Furthermore, as illustrated in FIGS. 1, 3, and the like, the autonomous mobile body 10 according to the present embodiment may include a connection terminal 555 and a power switch 560 of an external device on the back face. The autonomous mobile body 10 can be connected to an external device via the connection terminal 555 to perform information communication.

In addition, as illustrated in FIG. 5, the autonomous mobile body 10 according to the present embodiment includes two wheels 570 at the bottom face. The wheels 570 according to the present embodiment are driven by different motors 565. As a result, the autonomous mobile body 10 can realize moving operations such as a forward movement, a backward movement, a turning, and a rotation. In addition, the wheel 570 according to the present embodiment is provided so as to be capable of being stored inside the main body and protruding to the outside. The autonomous mobile body 10 according to the present embodiment can also perform a jumping movement by, for example, vigorously protruding the two wheels 570 to the outside. FIG. 5 illustrates a state in which the wheel 570 is stored inside the main body.

Figure 6:
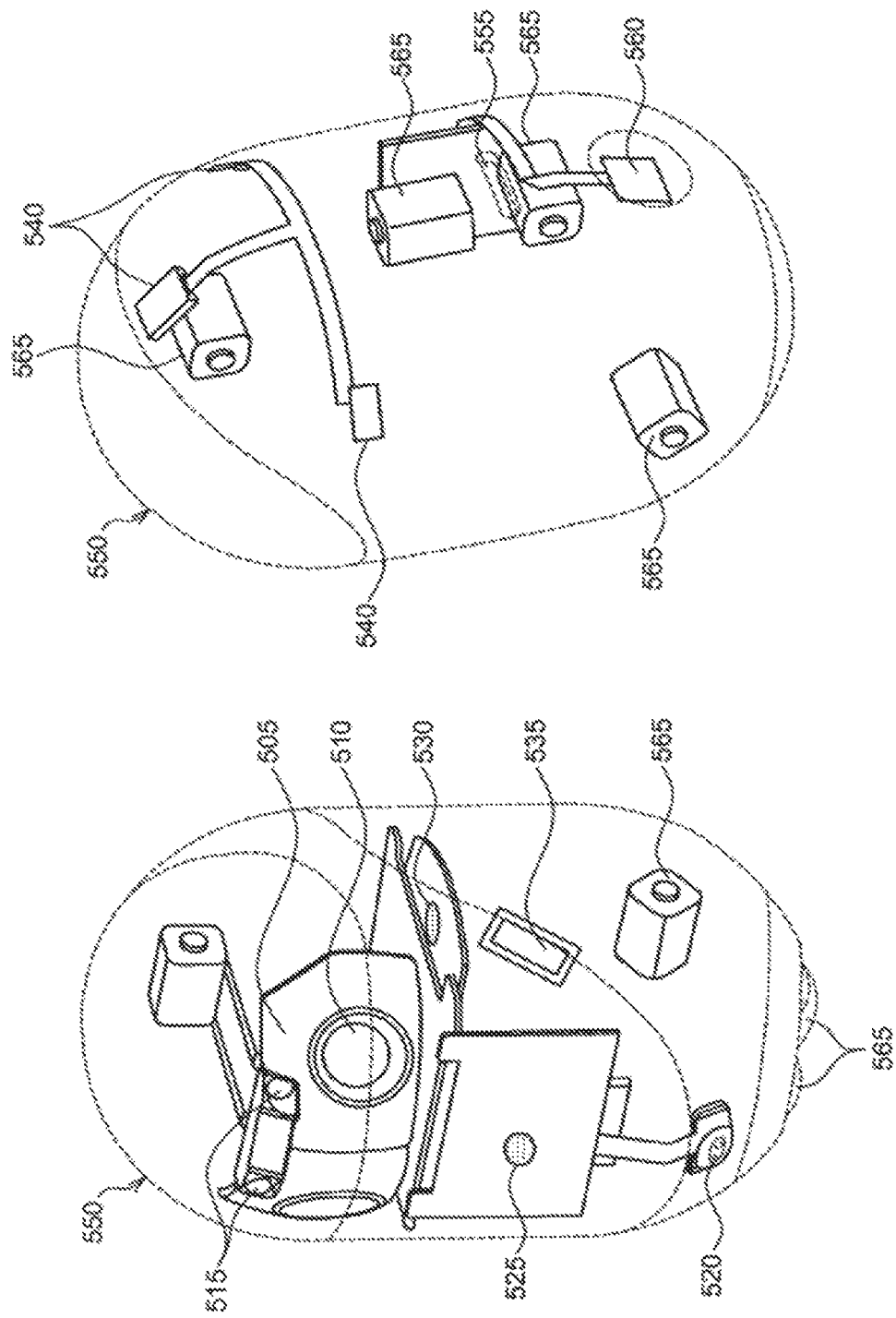
FIG. 6 is a schematic diagram for explaining an internal structure of the autonomous mobile body according to the embodiment.

The exterior of the autonomous mobile body 10 according to the present embodiment is described above. Next, an internal structure of the autonomous mobile body 10 according to the present embodiment will be described. FIG. 6 is a schematic diagram for explaining an internal structure of the autonomous mobile body 10 according to the present embodiment.

As illustrated on the left side of FIG. 6, the autonomous mobile body 10 according to the present embodiment includes an inertial sensor 525 and a communication device 530 disposed on an electronic substrate. The inertial sensor 525 detects an acceleration and an angular velocity of the autonomous mobile body 10. Furthermore, the communication device 530 is a configuration for realizing wireless communication with the outside, and includes, for example, a Bluetooth (registered trademark), and a Wi-Fi (registered trademark) antenna, and the like.

Furthermore, the autonomous mobile body 10 includes, for example, a speaker 535 inside the main body side face. The autonomous mobile body 10 can output various kinds of sound information including voice through the speaker 535.

Furthermore, as illustrated on the right side of FIG. 6, the autonomous mobile body 10 according to the present embodiment includes a plurality of microphones 540 inside the upper portion of the main body. The microphone 540 collects user's utterance and ambient environmental sound. Furthermore, since the autonomous mobile body 10 includes the plurality of microphones 540, it is possible to collect sounds generated in the surroundings with high sensitivity and to realize localization of a sound source.

Further, as illustrated in FIG. 6, the autonomous mobile body 10 includes a plurality of motors 565. The autonomous mobile body 10 may include, for example, two motors 565 that drives the substrate on which the eye portion 510 and the camera 515 are disposed in the vertical direction and the horizontal direction, two motors 565 that drives the left and right wheels 570, and one motor 565 for realizing the frontward tilting posture of the autonomous mobile body 10. The autonomous mobile body 10 according to the present embodiment can express a rich movement by the plurality of motors 565.

Figure 7:
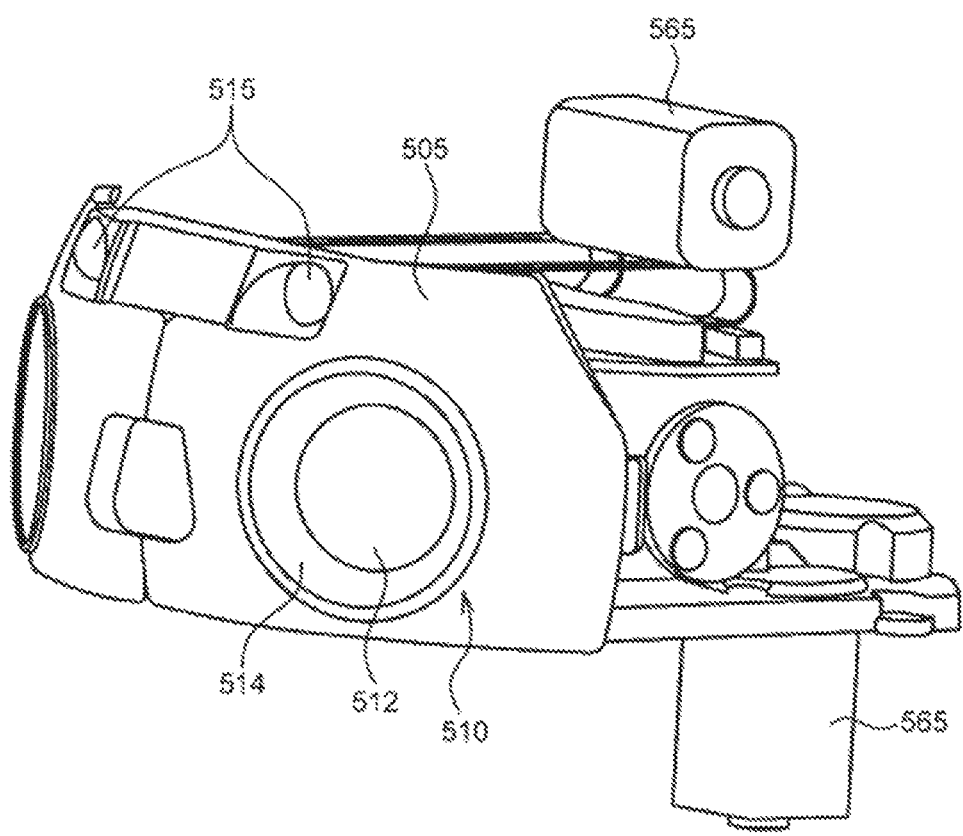
FIG. 7 is a view illustrating a configuration of a substrate according to the embodiment.
Figure 8:
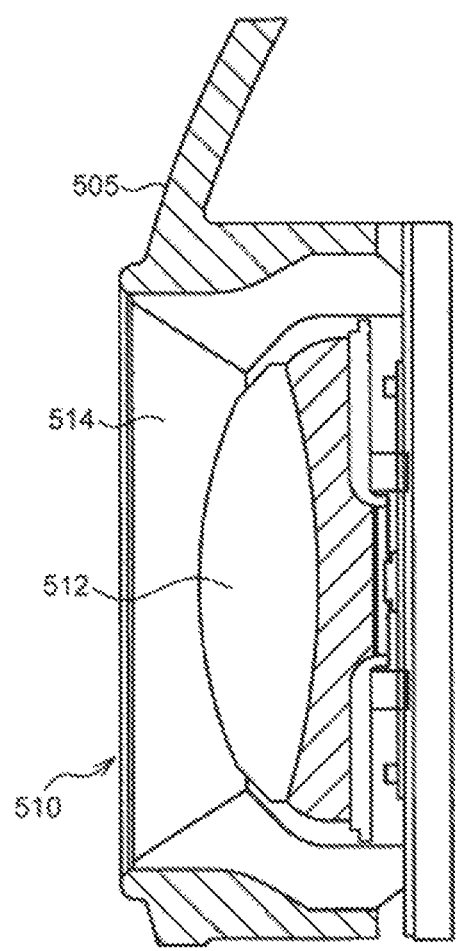
FIG. 8 is a cross-sectional view of the substrate according to the same embodiment.

Next, the configuration of the substrate 505 on which the eye portion 510 and the camera 515 according to the present embodiment are disposed and the configuration of the eye portion 510 will be described in detail. FIG. 7 is a diagram illustrating a configuration of the substrate 505 according to the present embodiment. FIG. 8 is a cross-sectional view of the substrate 505 according to the present embodiment. Referring to FIG. 7, the substrate 505 according to the present embodiment is connected to two motors 565. As described above, the two motors 565 can drive the substrate 505 on which the eye portion 510 and the camera 515 are disposed vertically and horizontally. According to this, the eye portion 510 of the autonomous mobile body 10 can be flexibly moved in the vertical direction and the horizontal direction, and a rich eyeball movement according to the situation and the operation can be expressed.

Furthermore, as illustrated in FIGS. 7 and 8, the eye portion 510 includes a central portion 512 corresponding to the iris and a peripheral edge portion 514 corresponding to a so-called white eye. The central portion 512 expresses any color including blue, red, green, and the like, and the peripheral edge portion 514 expresses white. As described above, the autonomous mobile body 10 according to the present embodiment can express a natural eyeball expression closer to an actual living thing by separating the configuration of the eye portion 510 into two.

Figure 9:
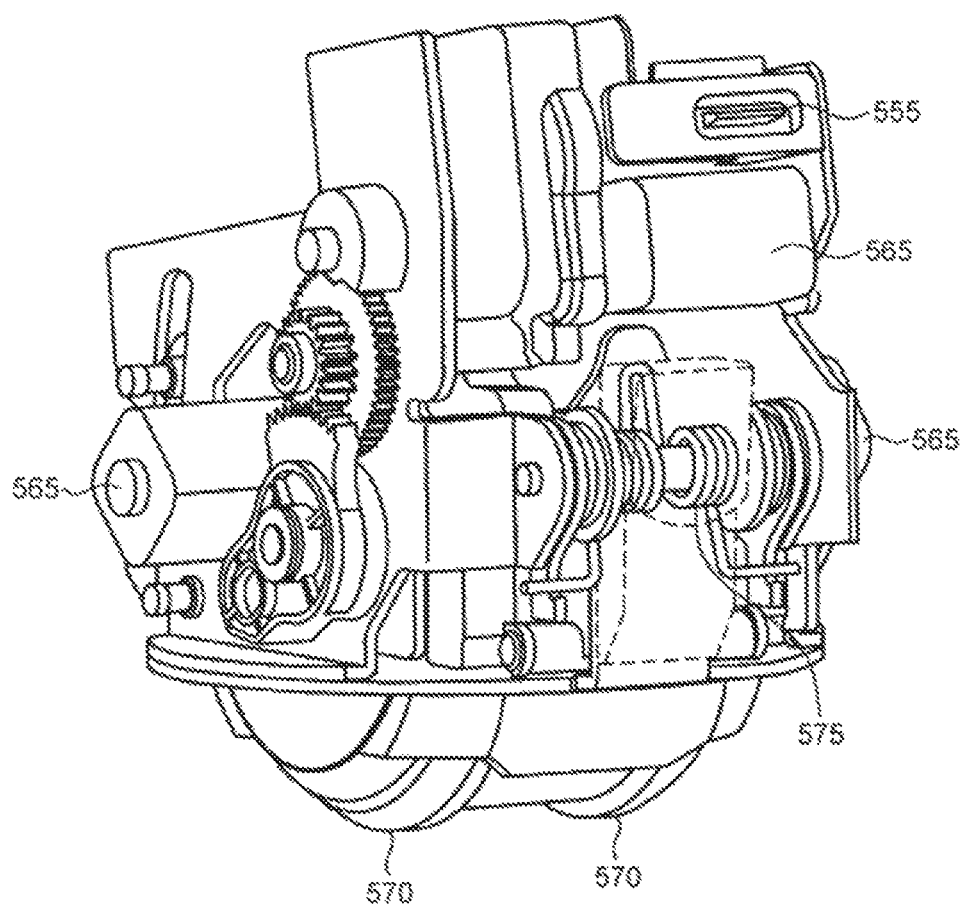
FIG. 9 is a view illustrating a peripheral structure of a wheel according to the embodiment.
Figure 10:
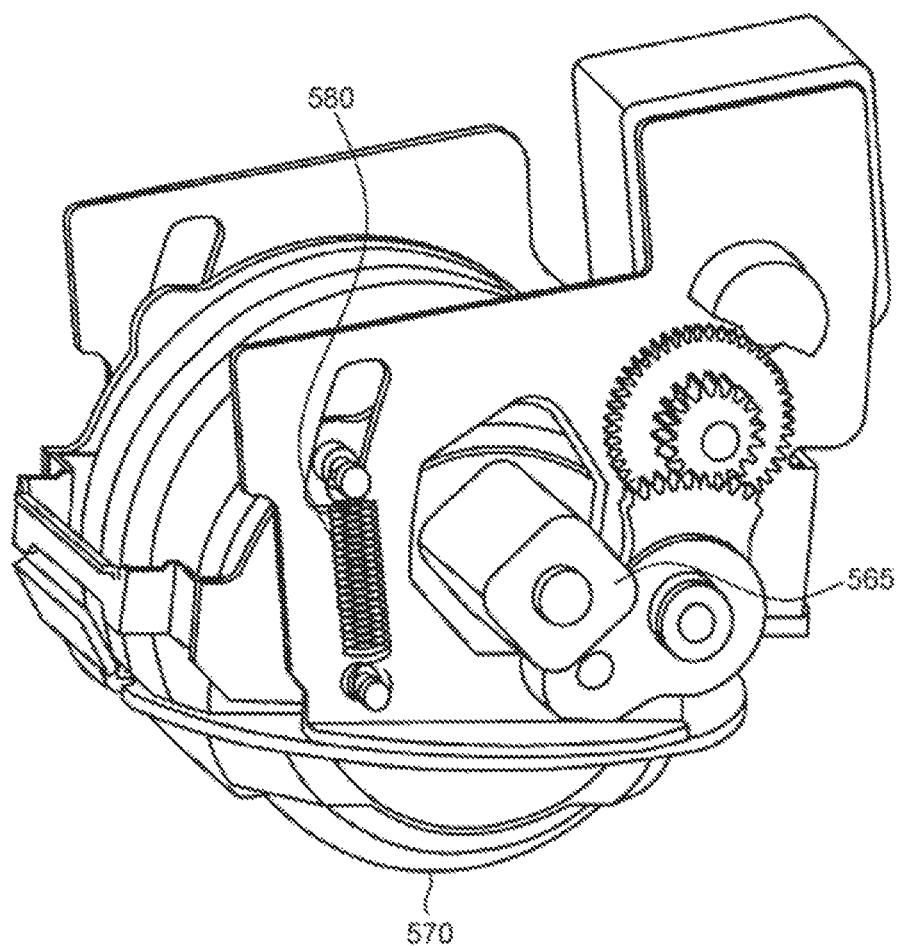
FIG. 10 is a view illustrating a peripheral structure of a wheel according to the embodiment.

Next, a structure of the wheel 570 according to the present embodiment will be described in detail with reference to FIGS. 9 and 10. FIGS. 9 and 10 are views illustrating a peripheral structure of the wheel 570 according to the present embodiment. As illustrated in FIG. 9, the two wheels 570 according to the present embodiment are driven by independent motors 565. According to such a configuration, it is possible to finely express a moving operation such as turning or rotation on the spot in addition to simple forward or backward movement.

As described above, the wheel 570 according to the present embodiment is provided so as to be able to be stored inside the main body and protrude to the outside. In addition, since the damper 575 is provided coaxially with the wheels 570 according to the present embodiment, it is possible to effectively reduce transmission of impact and vibration to the axle and the main body.

As illustrated in FIG. 10, the wheel 570 according to the present embodiment may be provided with an auxiliary spring 580. The driving of the wheel according to the present embodiment requires the largest torque among the drive units included in the autonomous mobile body 10, but by providing the auxiliary spring 580, all the motors 565 can be shared without using different motors 565 for the respective drive units.

Figure 11:
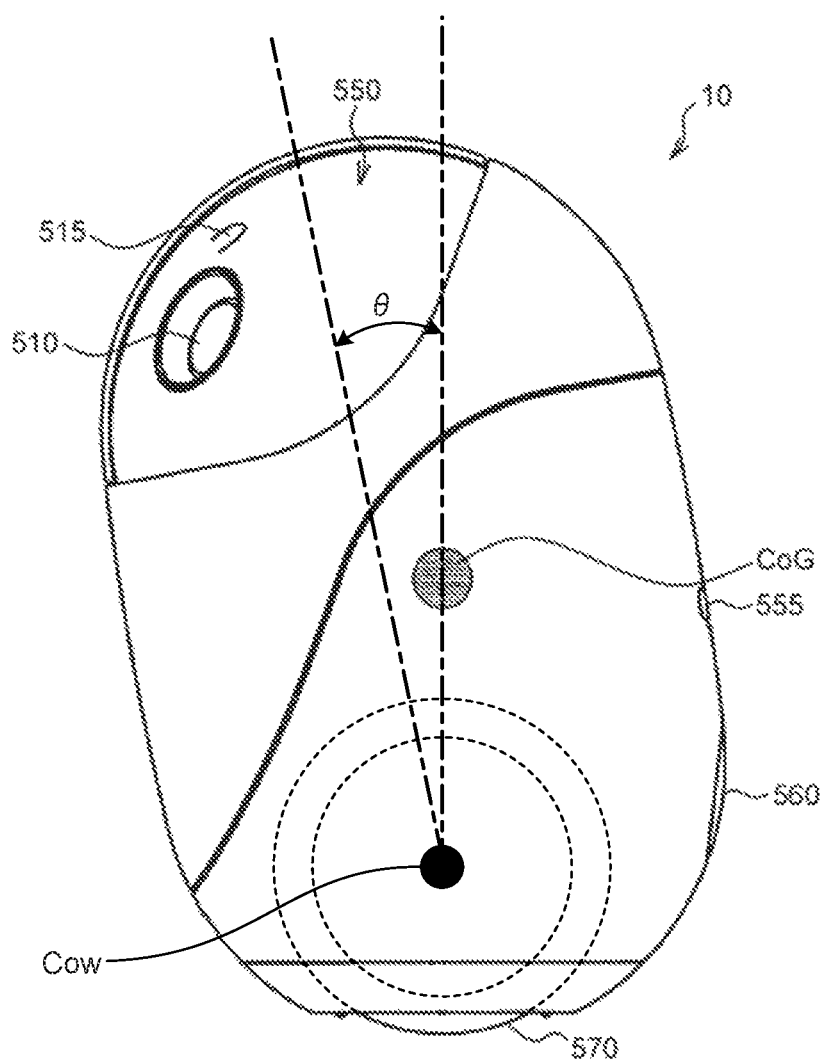
FIG. 11 is a diagram for describing traveling with a frontward tilting posture of the autonomous mobile body according to the embodiment.

Next, features at the time of traveling of the autonomous mobile body 10 according to the present embodiment will be described. FIG. 11 is a diagram for describing traveling with a frontward tilting posture of the autonomous mobile body 10 according to the present embodiment. One of the features of the autonomous mobile body 10 according to the present embodiment is that the autonomous mobile body performs a moving operation such as a front-back motion, a turning motion, and a rotation motion while maintaining a frontward tilting posture. FIG. 11 illustrates a state in which the autonomous mobile body 10 during traveling is viewed from a side face.

As illustrated in FIG. 11, one of the features of the autonomous mobile body 10 according to the present embodiment is that the autonomous mobile body performs a moving operation while tilting forward by an angle θ with respect to the vertical direction. The angle θ may be, for example, 10°. Hereinafter, the posture of the autonomous mobile body 10 illustrated in FIG. 11 is referred to as a reference posture of the autonomous mobile body 10. In addition, the angle θ illustrated in FIG. 11 is referred to as a reference posture angle corresponding to the reference posture of the autonomous mobile body 10.

Figure 12:
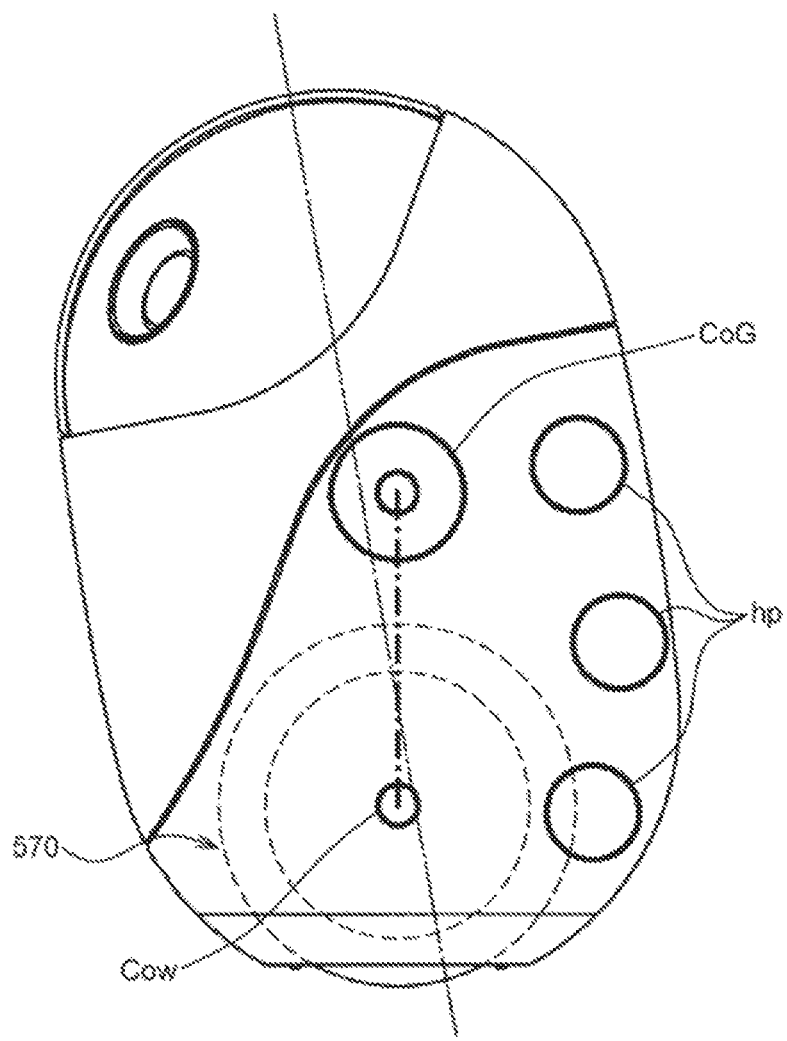
FIG. 12 is a diagram for describing traveling with a frontward tilting posture of the autonomous mobile body according to the embodiment.

At this time, as illustrated in FIG. 12, an operation controller 173 to be described later controls the moving operation of the autonomous mobile body 10 so that the center of gravity CoG of the autonomous mobile body 10 is positioned vertically above the rotation axis CoW of the wheel 570. In addition, on the back side of the autonomous mobile body 10 according to the present embodiment, weight parts hp are disposed to maintain balance at the time of frontward tilting posture. The weight part hp according to the present embodiment may be a heavier part than other components included in the autonomous mobile body 10, and may be, for example, the motor 565, a battery, or the like. According to the above component arrangement, the gyro control is facilitated in a state where the balance is maintained even when the head tilts forward, and it is possible to prevent the autonomous mobile body 10 from unintentionally falling and realize stable traveling with a frontward tilting posture.

Figure 13A:
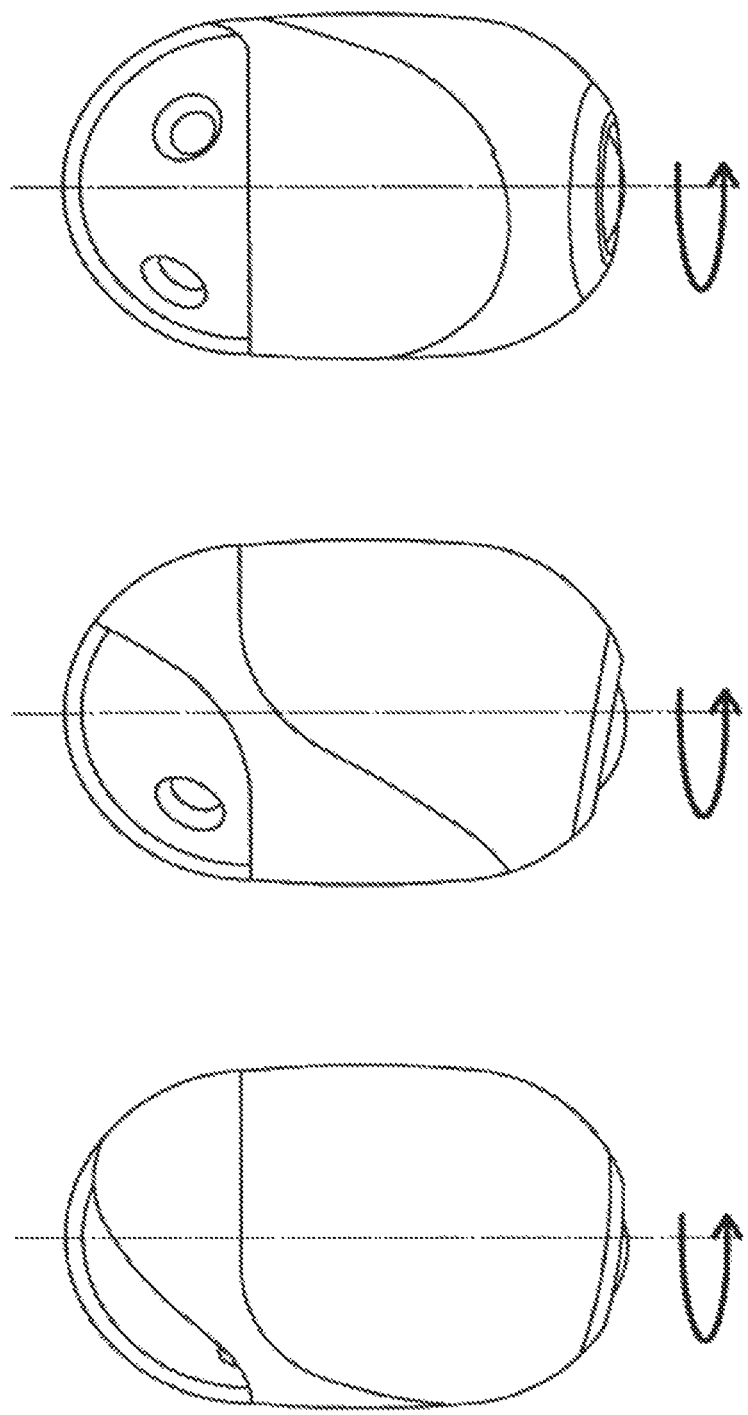
FIG. 13A is a diagram for describing an effect obtained by the frontward tilting motion of an autonomous mobile body 10 according to the embodiment.

Next, a moving operation in which the frontward tilting posture is maintained by the autonomous mobile body 10 according to the present embodiment will be described in more detail. FIGS. 13A and 13B are diagrams for describing an effect obtained by the frontward tilting motion of the autonomous mobile body 10 according to the present embodiment.

Here, FIG. 13A illustrates an example of a rotating operation in a case where the autonomous mobile body does not take a frontward tilting posture. As illustrated in FIG. 13A, when the autonomous mobile body 10 performs a moving operation such as a rotation or a front-back motion while keeping the elongated ellipsoid body upright without taking a frontward tilting posture, directionality is not felt in the body of the elongated ellipsoid, and it is difficult to wipe off an impression that the autonomous mobile body is an artificial object.

On the other hand, as illustrated in FIG. 13B, one of the features of the autonomous mobile body 10 according to the present embodiment is that a moving operation such as rotation is performed in a state where a frontward tilting posture is maintained. According to such a feature, since the upper front portion of the autonomous mobile body 10 evokes the head and the lower rear portion thereof evokes the waist, directionality also occurs in a simple elongated ellipsoid body.

As described above, according to the frontward tilting motion of the autonomous mobile body 10 according to the present embodiment, the structure corresponding to the body part of the human can be expressed by a relatively simple exterior, and it is possible to give the impression to the user as a living organism beyond a simple artifact by personifying the simple form. As described above, it can be said that the frontward tilting motion according to the present embodiment is a very effective means capable of expressing the expression of a robot having a relatively simple exterior such as an elongated ellipsoid in a rich manner and evoking a complicated motion like an actual living thing.

The configuration example of the autonomous mobile body 10 according to an embodiment of the present disclosure is described in detail above. Note that the above-described configuration described with reference to FIGS. 1, 2, 3, 4, 5, 6, 7, 8, 9, 10, 11, 12, 13A, and 13B are merely an example, and the configuration of the autonomous mobile body 10 according to an embodiment of the present disclosure is not limited to such an example. The shape and the internal structure of the autonomous mobile body 10 according to the present embodiment can be arbitrarily designed.

1.3. Functional Configuration Example of Autonomous Mobile Body 10

Figure 14:
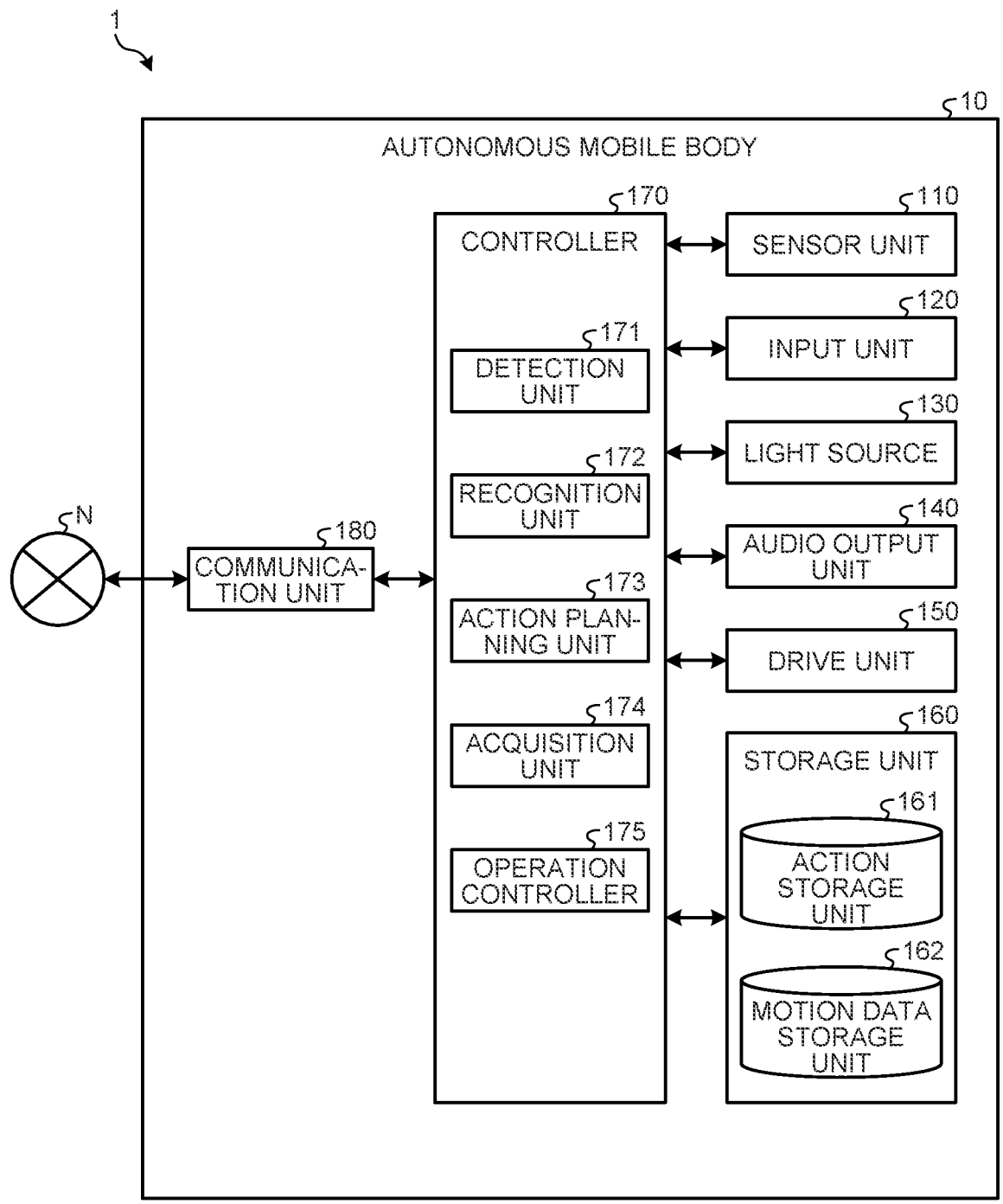
FIG. 14 is a block diagram illustrating a functional configuration example of an autonomous mobile body according to the embodiment.

Next, a functional configuration example of the autonomous mobile body 10 according to an embodiment of the present disclosure will be described. FIG. 14 is a block diagram illustrating a functional configuration example of the autonomous mobile body 10 according to the present embodiment. Referring to FIG. 14, the autonomous mobile body 10 according to the present embodiment includes a sensor unit 110, an input unit 120, a light source 130, an audio output unit 140, a drive unit 150, a storage unit 160, a controller 170, and a communication unit 180.

(Sensor Unit 110)

The sensor unit 110 according to the present embodiment has a function of collecting various kinds of sensor information related to the user and the surroundings. For this purpose, the sensor unit 110 according to the present embodiment includes, for example, the camera 515, the ToF sensor 520, the microphone 540, the inertial sensor 525, and the like described above. Furthermore, in addition to the above, the sensor unit 110 may include various sensors such as a geomagnetic sensor, a touch sensor, various optical sensors including an infrared sensor, and the like, a temperature sensor (for example, a thermistor), a humidity sensor, a battery level gauge IC, and the like. For example, the touch sensor detects contact by the user by a detection method such as a capacitance method, a resistive film method, a surface acoustic wave method, an infrared method, or an electromagnetic induction method.

(Input Unit 120)

The input unit 120 according to the present embodiment has a function of detecting a physical input operation by the user. The input unit 120 according to the present embodiment includes, for example, a button such as the power switch 560.

(Light Source 130)

The light source 130 according to the present embodiment expresses the eyeball movement of the autonomous mobile body 10. For this purpose, the light source 130 according to the present embodiment includes two eye portions 510.

(Audio Output Unit 140)

The audio output unit 140 according to the present embodiment has a function of outputting various sounds including voice. For this purpose, the audio output unit 140 according to the present embodiment includes the speaker 535, an amplifier, and the like.

(Drive Unit 150)

The drive unit 150 according to the present embodiment expresses a body operation of the autonomous mobile body 10. For this purpose, the drive unit 150 according to the present embodiment includes two wheels 570 and a plurality of motors 565. For example, the drive unit 150 performs a moving operation on the autonomous mobile body 10 according to the control by an operation controller 175. Furthermore, the drive unit 150 changes the posture of the autonomous mobile body 10 according to the control by the operation controller 175.

(Storage Unit 160)

The storage unit 160 according to the present embodiment is realized by, for example, a semiconductor memory device such as a random access memory (RAM) or a flash memory, or a storage device such as a hard disk or an optical disk. For example, the storage unit 160 stores an information processing program according to the embodiment. As illustrated in FIG. 14, the storage unit 160 includes an action storage unit 161 and a motion data storage unit 162.

(Action Storage Unit 161)

The action storage unit 161 stores various types of information about the behavior of the autonomous mobile body 10. The action storage unit according to the embodiment of the present disclosure will be described with reference to FIG. 15. FIG. 15 is a diagram illustrating an example of an action storage unit according to the embodiment of the present disclosure. In the example illustrated in FIG. 15, the action storage unit 161 includes items such as "environment information", "action instruction", and "operation ID".

The "environment information" indicates environment information about the surrounding environment of the autonomous mobile body 10. The "action instruction" indicates an instruction related to an action of the autonomous mobile body 10 corresponding to the environment information. The "operation ID" indicates an instruction related to the posture operation of the autonomous mobile body 10 corresponding to the environment information.

In the example illustrated in the first record of FIG. 15, in a case where a detection unit 171 detects the environment information of "detecting the face of the user with the camera", an acquisition unit 174 acquires an action instruction of "moving straight toward the user". Subsequently, the acquisition unit 174 refers to the motion data storage unit 162 to acquire motion data regarding the posture operation identified by the operation ID "M1".

(Motion Data Storage Unit 162)

The motion data storage unit 162 stores various types of information about motion data representing the posture operation of the autonomous mobile body 10. The motion data storage unit according to the embodiment of the present disclosure will be described with reference to FIG. 16. FIG. 16 is a diagram illustrating an example of a motion data storage unit according to the embodiment of the present disclosure. In the example illustrated in FIG. 16, the motion data storage unit 162 includes items such as "operation ID", "meaning", "emotion", and "motion data". Furthermore, the "motion data" further includes small items such as "motion data ID", "posture angle", "frequency/time", "set data ID", "playtime (ms)", and "angle (°)".

The "operation ID" indicates identification information for identifying a posture operation of the autonomous mobile body 10. The "meaning" indicates the meaning of the posture operation. Specifically, the posture operation (operation M1) identified by the operation ID "M1" indicates a posture operation corresponding to the expression during the straight movement of the autonomous mobile body 10. Further, the posture operation (operation M2) identified by the operation ID "M2" indicates a posture operation corresponding to the expression during the turning movement of the autonomous mobile body 10. Further, the posture operation (operation M3) identified by the operation ID "M3" indicates a posture operation corresponding to the expression when the autonomous mobile body 10 rotates on the spot. As described above, there are posture operations according to the type of the moving operation of the autonomous mobile body 10 such as the front-back motion, the turning motion, and the rotation motion.

Furthermore, the "emotion" indicates an emotion of the autonomous mobile body 10. The "motion data" indicates data representing the posture operation of the autonomous mobile body 10. The "motion data ID" indicates identification information for identifying motion data. Specifically, the emotion "joy" indicates that the emotion of the autonomous mobile body 10 corresponding to "joy". Furthermore, the motion data (motion data M11) identified by the motion data ID "M11" indicates a data group selected to express the posture operation of the autonomous mobile body 10 in a case where the posture operation of the autonomous mobile body 10 is the operation M1 and the emotion of the autonomous mobile body 10 corresponds to "joy". Furthermore, the motion data (motion data M12) identified by the motion data ID "M12" indicates a data group selected to express the posture operation of the autonomous mobile body 10 in a case where the posture operation of the autonomous mobile body 10 is the operation M1 and the emotion of the autonomous mobile body 10 corresponds to "fun". Note that, in the posture operation (operation M1) according to the expression during the straight movement of the autonomous mobile body 10, there may be various motion data corresponding to the type of the emotion of the autonomous mobile body 10 in addition to "joy" and "fun".

The emotion "anger" indicates the emotion of the autonomous mobile body 10. Furthermore, the motion data (motion data M21) identified by the motion data ID "M21" indicates a data group selected to express the posture operation of the autonomous mobile body 10 in a case where the posture operation of the autonomous mobile body 10 is the operation M2 and the emotion of the autonomous mobile body 10 corresponds to "anger". Furthermore, the motion data (motion data M22) identified by the motion data ID "M22" indicates a data group selected to express the posture operation of the autonomous mobile body 10 in a case where the posture operation of the autonomous mobile body 10 is the operation M2 and the emotion of the autonomous mobile body 10 corresponds to "sadness". Furthermore, in the posture operation (operation M2) corresponding to the expression at the time of the turning movement of the autonomous mobile body 10, there may be various motion data according to the type of emotion of the autonomous mobile body 10 in addition to "anger" and "sadness".

In addition, the "posture angle" indicates information about the posture angle of the autonomous mobile body 10. The "frequency/time" indicates information about a frequency or time for changing the posture angle of the autonomous mobile body 10. In addition, the "set data ID" indicates identification information for identifying data of a set of a posture angle to be reached and a time required to reach the posture angle to be reached. Specifically, the "set data ID" indicates identification information for identifying instruction information including set data of "playtime (ms)" and "angle (°)". The "playtime (ms)" indicates a time required to reach the posture angle to be reached. The "angle (°)" indicates a posture angle to be reached.

Specifically, the posture angle "sin wave ±3°" and the frequency/time "1 to 3 Hz" indicate that the motion data M11 corresponds to a posture operation in which vibration is performed at the frequency "1 to 3 Hz" by an amplitude angle "±3°" with respect to the reference posture angle θ. More specifically, the autonomous mobile body 10 executes a plurality of pieces of set data obtained by plotting points corresponding to the motion data M11 every 10 ms. For example, the set data of the playtime "0 to 10" (ms) and the angle "$\theta_{11}$" (°) identified by the set data ID "SD11" indicates the instruction information that the posture angle of the autonomous mobile body 10 is changed from the reference posture angle θ (°) by the posture angle $\theta_{11}$ (°) in 10 ms from 0 to 10 ms. Further, the set data of the playtime "10 to 20" (ms) and the angle "$\theta_{12}$") (° identified by the set data ID "SD12" indicates the instruction information that the posture angle of the autonomous mobile body 10 is further changed from "$\theta+\theta_{11}$" (°) by the posture angle $\theta_{12}$ (°) in 10 ms from 10 ms to 20 ms. In addition, the set data of the playtime "20 to 30" (ms) and the angle "$\theta_{13}$" (°) identified by the set data ID "SD13" indicates the instruction information that the posture angle of the autonomous mobile body 10 is further changed from "$\theta+\theta_{11}+\theta_{12}$" (°) by the posture angle $\theta_{13}$ (°) in 10 ms from 20 ms to 30 ms.

(Controller 170)

The controller 170 according to the present embodiment is realized by executing various programs (corresponding to an example of an information processing program) stored in a storage device inside the autonomous mobile body 10 using a RAM as a work area by a central processing unit (CPU), a micro processing unit (MPU), or the like. Furthermore, the controller 170 is realized by, for example, an integrated circuit such as an application specific integrated circuit (ASIC) or a field programmable gate array (FPGA).

The description returns to FIG. 14. The controller 170 has a function of controlling each component included in the autonomous mobile body 10. As illustrated in FIG. 14, the controller 170 includes the detection unit 171, a recognition unit 172, an action planning unit 173, the acquisition unit 174, and the operation controller 175, and realizes or executes a function and an action of information processing described below. Note that the internal configuration of the controller 170 is not limited to the configuration illustrated in FIG. 14, and may be another configuration as long as information processing to be described later is performed.

(Detection Unit 171)

The detection unit 171 detects environment information about the surrounding environment of the autonomous mobile body 10. Specifically, the detection unit 171 acquires the sensor information collected by the sensor unit 110 from the sensor unit 110. Subsequently, upon acquiring the sensor information, the detection unit 171 detects the environment information based on the acquired sensor information. For example, the detection unit 171 detects user information about a user, of the autonomous mobile body, located around the autonomous mobile body as the environment information.

The detection unit 171 detects, as the user information, image information indicating the face of the user, interactive information indicating the content of the interaction with the user, or contact information indicating the manner of contact of the user with the autonomous mobile body. Specifically, the detection unit 171 acquires image information captured by the camera 515 from the camera 515. Subsequently, the detection unit 171 detects the face of the user based on the acquired image information.

In addition, the detection unit 171 acquires, from the microphone 540, sound information collected by the microphone 540. Subsequently, when acquiring the sound information, the detection unit 171 identifies the voice of the user based on the acquired sound information. Subsequently, upon identifying the user's voice, the detection unit 171 converts the user's voice into a character string. Subsequently, the detection unit 171 analyzes the meaning of the converted character string. In this way, the detection unit 171 detects the interactive information indicating the content of the interaction with the user.

In addition, the detection unit 171 detects the angular velocity and the angular acceleration when the user touches the autonomous mobile body 10 by the gyro sensor, and learns the pattern of the angular velocity and the angular acceleration when the user touches the autonomous mobile body 10 in advance. For example, the detection unit 171 learns in advance the pattern of the angular velocity and the angular acceleration when the user lightly (softly) touches the head of the autonomous mobile body 10 several times with the finger. When the angular velocity or the angular acceleration of the pattern learned in advance is detected, the detection unit 171 detects that the user swings to the autonomous mobile body 10.

In addition, the detection unit 171 detects state information indicating an internal state of the autonomous mobile body as the environment information. The detection unit 171 detects temperature information indicating the temperature in the body of the autonomous mobile body or information indicating the remaining battery level of the autonomous mobile body as the state information. Specifically, the detection unit 171 acquires, from the thermistor, temperature information indicating the temperature in the body of the autonomous mobile body detected by the thermistor. Subsequently, when acquiring the temperature information, the detection unit 171 determines whether the temperature in the body of the autonomous mobile body exceeds a predetermined threshold value. When it is determined that the temperature in the body of the autonomous mobile body exceeds the predetermined threshold value, the detection unit 171 detects that the temperature in the body of the autonomous mobile body exceeds the predetermined threshold value. When detecting that the temperature in the body of the autonomous mobile body exceeds a predetermined threshold value, the detection unit 171 may detect that it is necessary to lower the CPU load of the autonomous mobile body.

In addition, the detection unit 171 acquires, from the battery level gauge IC, information indicating the remaining battery level of the autonomous mobile body detected by the battery level gauge IC. Subsequently, upon acquiring the information indicating the remaining battery level, the detection unit 171 determines whether the remaining battery level of the autonomous mobile body is equal to or less than a predetermined threshold value. When determining that the remaining battery level of the autonomous mobile body is equal to or less than the predetermined threshold value, the detection unit 171 detects that the remaining battery level of the autonomous mobile body is equal to or less than the predetermined threshold value. When detecting that the remaining battery level of the autonomous mobile body is equal to or less than a predetermined threshold value, the detection unit 171 may detect that it is necessary to charge the battery of the autonomous mobile body.

(Recognition Unit 172)

The recognition unit 172 has a function of performing various recognition related to the user, the surrounding environment, and the state of the autonomous mobile body 10 based on the sensor information acquired by the detection unit 171. As an example, the recognition unit 172 may perform user identification, recognition of an expression or a line of sight, object recognition, color recognition, shape recognition, marker recognition, obstacle recognition, step recognition, brightness recognition, and the like.

Furthermore, the recognition unit 172 performs emotion recognition, word understanding, sound source localization, and the like related to the user's voice. In addition, the recognition unit 172 can recognize the ambient temperature, the presence of the moving body, the posture of the autonomous mobile body 10, and the like.

Furthermore, the recognition unit 172 has a function of estimating and understanding based on the recognized information a surrounding environment and a situation in which the autonomous mobile body 10 is placed. At this time, the recognition unit 172 may comprehensively perform situation estimation using environmental knowledge stored in advance.

Furthermore, the recognition unit 172 estimates the emotion of the autonomous mobile body 10 based on the sensor information acquired by the detection unit 171. Specifically, the recognition unit 172 estimates emotions such as joy, anger, sadness, and fun as the emotions of the autonomous mobile body 10. For example, in a case where the recognition unit 172 detects that the number of times the user talks to the autonomous mobile body exceeds a predetermined number of times within a predetermined time, the recognition unit estimates that the emotion of the autonomous mobile body 10 corresponding to joy. Furthermore, in a case where the recognition unit 172 detects that it is praises by the user, the recognition unit may estimate that the emotion of the autonomous mobile body 10 corresponds to joy. Furthermore, the recognition unit 172 may estimate that the emotion of the autonomous mobile body 10 corresponds to sadness in a case where it is detected that it is reprimanded by the user.

Note that the emotion of the autonomous mobile body 10 is not limited to a general emotion, and may be a broader concept. For example, the recognition unit 172 estimates the emotion, as the emotion of the autonomous mobile body 10, confusion (panicking) and deterioration (feeble). For example, when detecting that the remaining battery level of the autonomous mobile body is equal to or less than a predetermined threshold value with the state of charge of the autonomous mobile body 10 as an index of hunger (or satiety), the recognition unit 172 may estimate that the emotion of the autonomous mobile body 10 corresponds to deterioration (feeble).

Furthermore, the recognition unit 172 estimates the user's emotion based on the user's facial expression detected by the detection unit 171. Subsequently, when estimating the user's emotion, the recognition unit 172 may estimate the estimated emotion of the user as the emotion of the autonomous mobile body 10.

Furthermore, the recognition unit 172 may estimate the emotion of the autonomous mobile body 10 based on the learning model. For example, when the sensor information acquired by the detection unit 171 is input, the recognition unit 172 estimates the emotion of the autonomous mobile body 10 using a learning model learned to output the emotion of the autonomous mobile body 10.

Here, it is assumed that the model data MDT1 of the learning model is realized by a regression model indicated by "$y=a_1*x_1+a_2*x_2+ \ldots +a_i*x_i$". In this case, the first element included in the model data MDT1 corresponds to the input data (xi) such as x1 and x2. Further, the weight of the first element corresponds to the coefficient ai corresponding to xi. Here, the regression model can be regarded as a simple perceptron having an input layer and an output layer. When each model is regarded as a simple perceptron, the first element can correspond to any node included in the input layer, and the second element can be regarded as a node included in the output layer.

For example, the recognition unit 172 estimates the emotion of the autonomous mobile body 10 by using a learning model learned so as to estimate that the number of times that it has been spoken by the user is larger, the higher the probability that the emotion of the autonomous mobile body 10 corresponds to joy when the number of times that it has been spoken by the user is x1. In addition, the recognition unit 172 estimates the emotion of the autonomous mobile body 10 using the learning model learned so as to estimate that the probability that the emotion of the autonomous mobile body 10 corresponds to joy is high as it is praised by the user when the fact that it is praised by the user is x2.

The recognition unit 172 estimates the emotion of the autonomous mobile body 10 using a model having any structure such as the regression model or the neural network described above. Specifically, a coefficient of the model data MDT1 is set so as to output the emotion of the autonomous mobile body 10 when the sensor information is input. The recognition unit 172 estimates the emotion of the autonomous mobile body 10 using such model data MDT1.

(Action Planning Unit 173)

Furthermore, the action planning unit 173 has a function of planning an action performed by the autonomous mobile body 10 based on the situation and the learning knowledge estimated by the recognition unit 210. The action planning unit 173 executes an action plan using, for example, a machine learning algorithm such as deep learning.

Furthermore, the action planning unit 173 plans an action to be performed by the autonomous mobile body 10 based on the environment information detected by the detection unit 171. Specifically, the action planning unit 173 makes a movement plan for performing a moving operation including at least one of a front-back motion, a turning motion, or a rotation motion based on the environment information detected by the detection unit 171.

(Acquisition Unit 174)

The acquisition unit 174 acquires motion data corresponding to the posture operation of the autonomous mobile body. Specifically, when the environment information is detected by the detection unit 171, the acquisition unit 174 refers to the action storage unit 161 to acquire an action instruction corresponding to the detected environment information. For example, when the detection unit 171 detects the face of the user with the camera, the acquisition unit 174 refers to the action storage unit 161 to acquire an action instruction to go straight toward the user. Subsequently, when acquiring the action instruction, the acquisition unit 174 refers to the action storage unit 161 to acquire the operation ID. For example, when acquiring an action instruction to go straight toward the user, the acquisition unit 174 acquires the operation ID "M1".

Furthermore, when the acquisition unit 174 acquires the operation ID, the recognition unit 172 estimates the emotion of the autonomous mobile body. For example, when the acquisition unit 174 acquires the operation ID "M1", the recognition unit 172 estimates that the emotion of the autonomous mobile body corresponds to "joy". When the recognition unit 172 estimates the emotion of the autonomous mobile body, the acquisition unit 174 refers to the motion data storage unit 162 to acquire motion data according to the emotion of the autonomous mobile body. For example, when the recognition unit 172 estimates that the emotion of the autonomous mobile body corresponds to "joy", the acquisition unit 174 acquires the motion data M11 corresponding to "joy" that is the emotion of the autonomous mobile body.

More specifically, the acquisition unit 174 sequentially acquires each set data of "playtime" and "angle" corresponding to the motion data M11 in accordance with the lapse of time. First, the acquisition unit 174 acquires the set data SD11 corresponding to the motion data M11. Subsequently, the acquisition unit 174 acquires the set data SD12 corresponding to the motion data M11 10 ms after the set data SD11 is acquired. Subsequently, the acquisition unit 174 acquires the set data SD13 corresponding to the motion data M11 10 ms after the set data SD12 is acquired. In this way, the acquisition unit 174 sequentially acquires each set data corresponding to the motion data M11 in accordance with the lapse of time. Note that the acquisition unit 174 may acquire a plurality of pieces of set data corresponding to the motion data M11 at a time.

Furthermore, for example, when the acquisition unit 174 acquires the operation ID "M1", the recognition unit 172 estimates that the emotion of the autonomous mobile body corresponds to "fun". When the recognition unit 172 estimates that the emotion of the autonomous mobile body corresponds to "fun", the acquisition unit 174 acquires the motion data M12 corresponding to "fun" that is the emotion of the autonomous mobile body.

(Operation Controller 175)

The operation controller 175 controls the operation of the autonomous mobile body 10 based on the action plan by an action planning unit 220. Specifically, the operation controller 175 moves the autonomous mobile body 10 while maintaining the frontward tilting posture based on the action plan by the action planning unit 220. For example, in the operation controller 175, the operation controller 175 controls a moving operation of the autonomous mobile body including at least one of a front-back motion, a turning motion, or a rotation motion.

The operation controller 175 controls the moving operation of the autonomous mobile body that travels while maintaining the inverted state, and controls the posture operation of the autonomous mobile body that temporarily changes from the reference posture in the inverted state. Note that the operation controller 175 controls the posture operation of the autonomous mobile body so that the reference posture in the inverted state is the frontward tilting posture. Specifically, the operation controller 175 controls the posture operation of the autonomous mobile body based on the motion data, according to the emotion, acquired by the acquisition unit 174. For example, when the motion data M11 corresponding to "joy" is acquired by the acquisition unit 174, the operation controller 175 controls the posture operation of the autonomous mobile body based on the motion data M11 corresponding to "joy". Furthermore, for example, in a case where the motion data M12 corresponding to "fun" is acquired by the acquisition unit 174, the operation controller 175 controls the posture operation of the autonomous mobile body based on the motion data M12 corresponding to "fun". Note that the acquisition unit 174 may acquire a plurality of pieces of set data corresponding to the motion data M11 at a time. Furthermore, the operation controller 175 may sequentially execute a plurality of pieces of set data acquired at a time in accordance with the lapse of time.

Furthermore, the operation controller 175 controls the posture operation of the autonomous mobile body based on the state information indicating the internal state of the autonomous mobile body. The operation controller 175 controls the posture operation of the autonomous mobile body based on temperature information indicating the temperature in the body of the autonomous mobile body or information indicating the remaining battery level of the autonomous mobile body as the state information.

Furthermore, the operation controller 173 performs, for example, an action plan based on sensor information collected by the sensor unit 110, and controls an eyeball expression by the light source 130 and a sound output by the audio output unit 140. Furthermore, the operation controller 173 may control the operation of the drive unit 150 based on the action plan described above.

1.3.1. Details of Posture Control According to Embodiment

Figure 17:
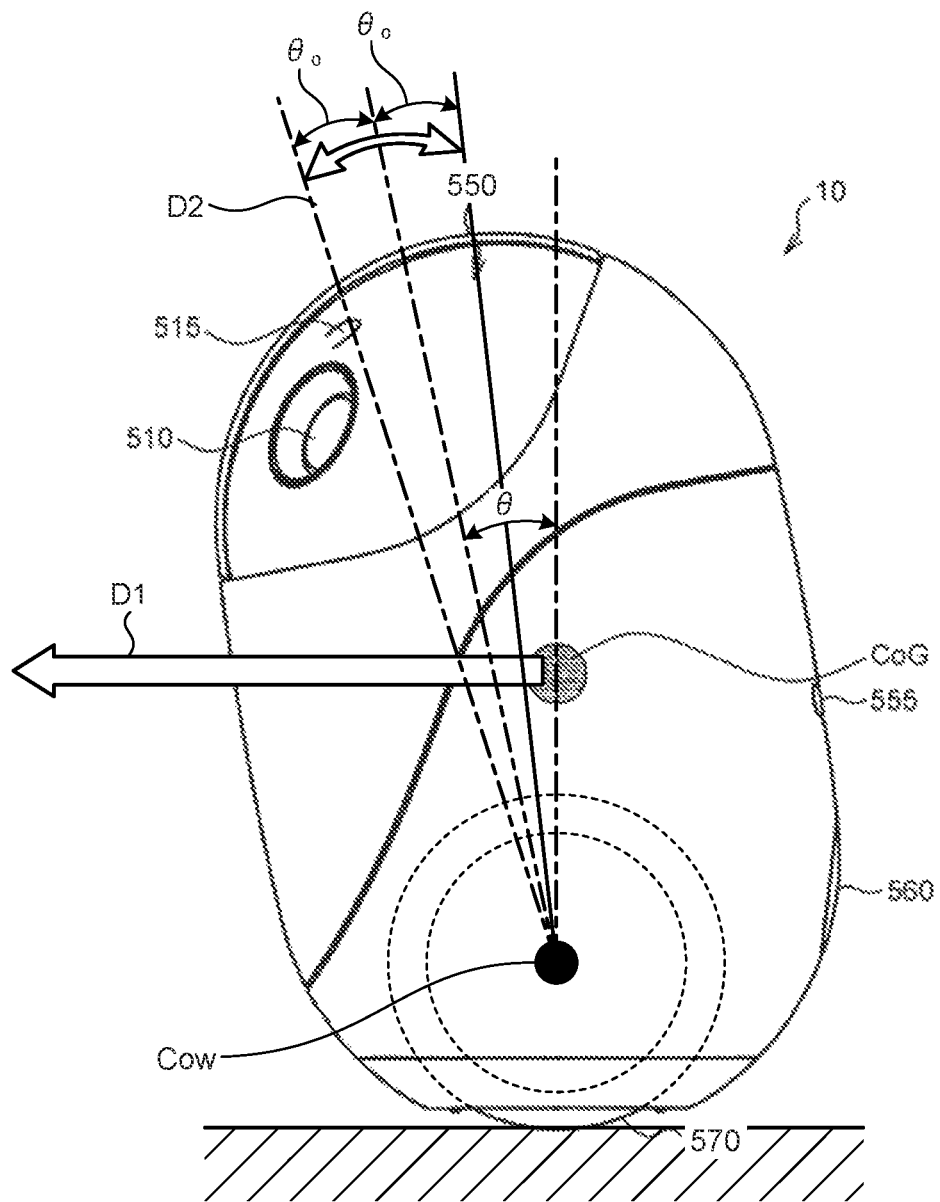
FIG. 17 is a diagram for describing posture control based on motion data according to the embodiment.

The autonomous mobile body has wheels on the left and right with respect to the traveling direction, and the operation controller 175 controls the posture operation of the autonomous mobile body based on motion data corresponding to a posture operation of vibrating around a reference posture angle corresponding to a reference posture with an axle of the left and right wheels of the autonomous mobile body as a rotation axis. Furthermore, the operation controller 175 controls the moving operation of the autonomous mobile body including at least one of the front-back motion, the turning motion, or the rotation motion, and controls the posture operation of the autonomous mobile body so that the autonomous mobile body vibrates at a predetermined frequency by a predetermined amplitude angle around a reference posture angle corresponding to the reference posture with the axle of the left and right wheels of the autonomous mobile body as the rotation axis. This point will be described in detail with reference to FIG. 17. FIG. 17 is a diagram for describing posture control based on motion data according to the embodiment. FIG. 17 illustrates a state in which the autonomous mobile body 10 that performs the moving operation while tilting forward by the angle θ with respect to the vertical direction is viewed from the side. In addition, in FIG. 17, a direction in which the autonomous mobile body 10 performs a moving operation such as a forward traveling motion or a turning motion is indicated by a traveling direction D1. Further, a direction in which the autonomous mobile body 10 performs a posture operation corresponding to the motion data is indicated by a vibration direction D2.

1.3.1.1. Motion Data Expressing Joy

In the example illustrated in FIG. 17, when the emotion of the autonomous mobile body 10 corresponds to joy, the operation controller 175 controls the forward traveling motion of the autonomous mobile body 10, and controls the posture operation of the autonomous mobile body 10 so that it vibrates at the first frequency $f_1$ (for example, $f_1$=1 to 3 Hz) by the first amplitude angle $\theta_1$ (for example, $\theta_1=\theta_0=3°$) around the reference posture angle θ corresponding to the reference posture with the axle of the left and right wheels of the autonomous mobile body 10 as a rotation axis COW.

Specifically, when the motion data M11 corresponding to "joy" is acquired by the acquisition unit 174, the operation controller 175 controls the posture operation of the autonomous mobile body based on the motion data M11 corresponding to "joy". More specifically, the operation controller 175 controls the posture operation of the autonomous mobile body 10 so that it vibrates at the first frequency $f_1$ (for example, $f_1=1$ to 3 Hz) by the first amplitude angle $\theta_1$ (for example, $\theta_1=\theta_0=3°$) around the reference posture angle $\theta$ by executing a plurality of pieces of set data obtained by plotting the angle indicated by the sine signal corresponding to the motion data M11 every 10 ms. The operation controller 175 controls the posture angle of the autonomous mobile body based on each set data of "playtime" and "angle" corresponding to the motion data M11.

For example, the acquisition unit 174 acquires the set data SD11 corresponding to the motion data M11. When the acquisition unit 174 acquires the set data SD11, the operation controller 175 controls the posture operation of the autonomous mobile body so as to change the posture angle of the autonomous mobile body 10 from the reference posture angle $\theta$ (°) by the posture angle $\theta_{11}$ (°) in 10 ms from 0 to 10 ms based on the set data SD11. In addition, the acquisition unit 174 acquires the set data SD12 when 10 ms has elapsed since the set data SD11 was acquired. When the acquisition unit 174 acquires the set data SD12, the operation controller 175 controls the posture operation of the autonomous mobile body so as to further change the posture angle of the autonomous mobile body 10 from "$\theta+\theta_{11}$" (°) by the posture angle $\theta_{12}$ (°) in 10 ms from 10 to 20 ms. In addition, the acquisition unit 174 acquires the set data SD13 when 10 ms has elapsed since the set data SD12 was acquired. When the acquisition unit 174 acquires the set data SD13, the operation controller 175 controls the posture operation of the autonomous mobile body so as to further change the posture angle of the autonomous mobile body 10 from "$\theta+\theta_{11}+\theta_{12}$" (°) by the posture angle $\theta_{13}$ (°) in 10 ms from 20 ms to 30 ms. In this way, the acquisition unit 174 sequentially acquires each set data corresponding to the motion data M11 in accordance with the lapse of time. In addition, the operation controller 175 controls the posture operation of the autonomous mobile body so as to change the posture angle of the autonomous mobile body 10 according to the set data of the motion data M11 sequentially acquired by the acquisition unit 174 according to the lapse of time.

1.3.1.2. Motion Data Expressing Fun

Furthermore, in the example illustrated in FIG. 17, when the emotion of the autonomous mobile body 10 corresponds to fun, the operation controller 175 controls the forward traveling motion of the autonomous mobile body 10, and controls the posture operation of the autonomous mobile body 10 so that it vibrates at the frequency $f_4$ (for example, $f_4=\frac{1}{2}$ to 1 Hz) smaller than the first frequency $f_1$ by the amplitude angle $\theta_4$ (for example, $\theta_4=\theta_0=5°$) larger than the first amplitude angle $\theta_1$ around the reference posture angle $\theta$ corresponding to the reference posture with the axle of the left and right wheels of the autonomous mobile body 10 as the rotation axis COW.

Specifically, when the motion data M12 corresponding to "fun" is acquired by the acquisition unit 174, the operation controller 175 controls the posture operation of the autonomous mobile body based on the motion data M12 corresponding to "fun". More specifically, the operation controller 175 controls the posture operation of the autonomous mobile body 10 so that it vibrates at a frequency $f_4$ (for example, $f_4=\frac{1}{2}$ to 1 Hz) smaller than the first frequency $f_1$ by the amplitude angle $\theta_4$ (for example, $\theta_4=\theta_0=5°$) larger than the first amplitude angle $\theta_1$ around the reference posture angle $\theta$ by executing a plurality of pieces of set data obtained by plotting the angle indicated by the sine signal corresponding to the motion data M12 every 10 ms. The operation controller 175 controls the posture angle of the autonomous mobile body based on each set data of "playtime" and "angle" corresponding to the motion data M12.

For example, the acquisition unit 174 acquires the set data SD41 corresponding to the motion data M12. When the acquisition unit 174 acquires the set data SD41, the operation controller 175 controls the posture operation of the autonomous mobile body so as to change the posture angle of the autonomous mobile body 10 from the reference posture angle $\theta$ (°) by the posture angle $\theta_{41}$ (°) in 10 ms from 0 to 10 ms based on the set data SD41. In this way, the acquisition unit 174 sequentially acquires each set data corresponding to the motion data M12 in accordance with the lapse of time. In addition, the operation controller 175 controls the posture operation of the autonomous mobile body so as to change the posture angle of the autonomous mobile body 10 according to the set data of the motion data M12 sequentially acquired by the acquisition unit 174 according to the lapse of time.

1.3.1.3. Motion Data Expressing Anger

Furthermore, in the example illustrated in FIG. 17, when the emotion of the autonomous mobile body 10 is anger, the operation controller 175 controls the turning motion of the autonomous mobile body 10, and controls the posture operation of the autonomous mobile body so that it vibrates at the second frequency $f_2$ (for example, $f_2=1$ to 2 Hz) by the second amplitude angle $\theta_2$ (for example, $\theta_2=\theta_0=10°$) around the reference posture angle $\theta$ corresponding to the reference posture with the axle of the left and right wheels of the autonomous mobile body 10 as the rotation axis COW.

Specifically, when the motion data M21 corresponding to "anger" is acquired by the acquisition unit 174, the operation controller 175 controls the posture operation of the autonomous mobile body based on the motion data M21 corresponding to "anger". More specifically, the operation controller 175 controls the posture operation of the autonomous mobile body 10 so that it vibrates at the second frequency $f_2$ (for example, $f_2=1$ to 2 Hz) by the second amplitude angle $\theta_2$ (for example, $\theta_2=\theta_0=10°$) around the reference posture angle $\theta$ by executing a plurality of pieces of set data obtained by plotting the angle indicated by the sine signal corresponding to the motion data M21 every 10 ms. The operation controller 175 controls the posture angle of the autonomous mobile body based on each set data of "playtime" and "angle" corresponding to the motion data M21.

For example, the acquisition unit 174 acquires the set data SD21 corresponding to the motion data M21. When the acquisition unit 174 acquires the set data SD21, the operation controller 175 controls the posture operation of the autonomous mobile body so as to change the posture angle of the autonomous mobile body 10 from the reference posture angle $\theta$ (°) by the posture angle $\theta_{21}$ (°) in 10 ms from 0 to 10 ms based on the set data SD21. In addition, the acquisition unit 174 acquires the set data SD22 when 10 ms has elapsed since the set data SD21 was acquired. When the acquisition unit 174 acquires the set data SD22, the operation controller 175 controls the posture operation of the autonomous mobile body so as to further change the posture angle of the autonomous mobile body 10 from "$\theta+\theta_{21}$" (°) by the posture angle $\theta_{22}$ (°) in 10 ms from 10 to 20 ms. In addition, the acquisition unit 174 acquires the set data SD23 when 10 ms has elapsed since the set data SD22 was acquired. When the acquisition unit 174 acquires the set data SD23, the operation controller 175 controls the posture operation of the autonomous mobile body so as to further change the posture angle of the autonomous mobile body 10 from "θ+θ$_{21}$+θ$_{22}$" (°) by the posture angle θ$_{23}$ (°) in 10 ms from 20 ms to 30 ms. In this way, the acquisition unit 174 sequentially acquires each set data corresponding to the motion data M21 in accordance with the lapse of time. In addition, the operation controller 175 controls the posture operation of the autonomous mobile body so as to change the posture angle of the autonomous mobile body 10 according to the set data of the motion data M21 sequentially acquired by the acquisition unit 174 according to the lapse of time.

1.3.1.4. Motion Data Expressing Sadness

Furthermore, in the example illustrated in FIG. 17, when the emotion of the autonomous mobile body 10 is sadness, the operation controller 175 controls the turning motion of the autonomous mobile body 10, and controls the posture operation of the autonomous mobile body 10 so that and it vibrates at the frequency $f_3$ (for example, $f_3$=5 Hz) larger than the second frequency $f_2$ by the amplitude angle $θ_3$ (for example, $θ_3$=$θ_0$=3°) smaller than the second amplitude angle $θ_2$ around the reference posture angle θ corresponding to the reference posture with the axle of the left and right wheels of the autonomous mobile body 10 as the rotation axis COW.

Specifically, when the motion data M22 corresponding to "sadness" is acquired by the acquisition unit 174, the operation controller 175 controls the posture operation of the autonomous mobile body based on the motion data M22 corresponding to "sadness". More specifically, the operation controller 175 controls the posture operation of the autonomous mobile body 10 so that it vibrates around the reference posture angle θ at a frequency $f_3$ (for example, $f_3$=5 Hz) larger than the second frequency $f_2$ by the amplitude angle $θ_3$ (for example, $θ_3$=$θ_0$=3°) smaller than the second amplitude angle $θ_2$ by executing a plurality of pieces of set data obtained by plotting the angle indicated by the sine signal corresponding to the motion data M22 every 10 ms. The operation controller 175 controls the posture angle of the autonomous mobile body based on each set data of "playtime" and "angle" corresponding to the motion data M22.

For example, the acquisition unit 174 acquires the set data SD31 corresponding to the motion data M22. When the acquisition unit 174 acquires the set data SD31, the operation controller 175 controls the posture operation of the autonomous mobile body so as to change the posture angle of the autonomous mobile body 10 from the reference posture angle θ (°) by the posture angle $θ_{31}$ (°) in 10 ms from 0 to 10 ms based on the set data SD31. In this way, the acquisition unit 174 sequentially acquires each set data corresponding to the motion data M22 in accordance with the lapse of time. In addition, the operation controller 175 controls the posture operation of the autonomous mobile body so as to change the posture angle of the autonomous mobile body 10 according to the set data of the motion data M22 sequentially acquired by the acquisition unit 174 according to the lapse of time.

1.3.1.5. Temporal Change in Angular Velocity of Wheel in Motion Data

Figure 18:
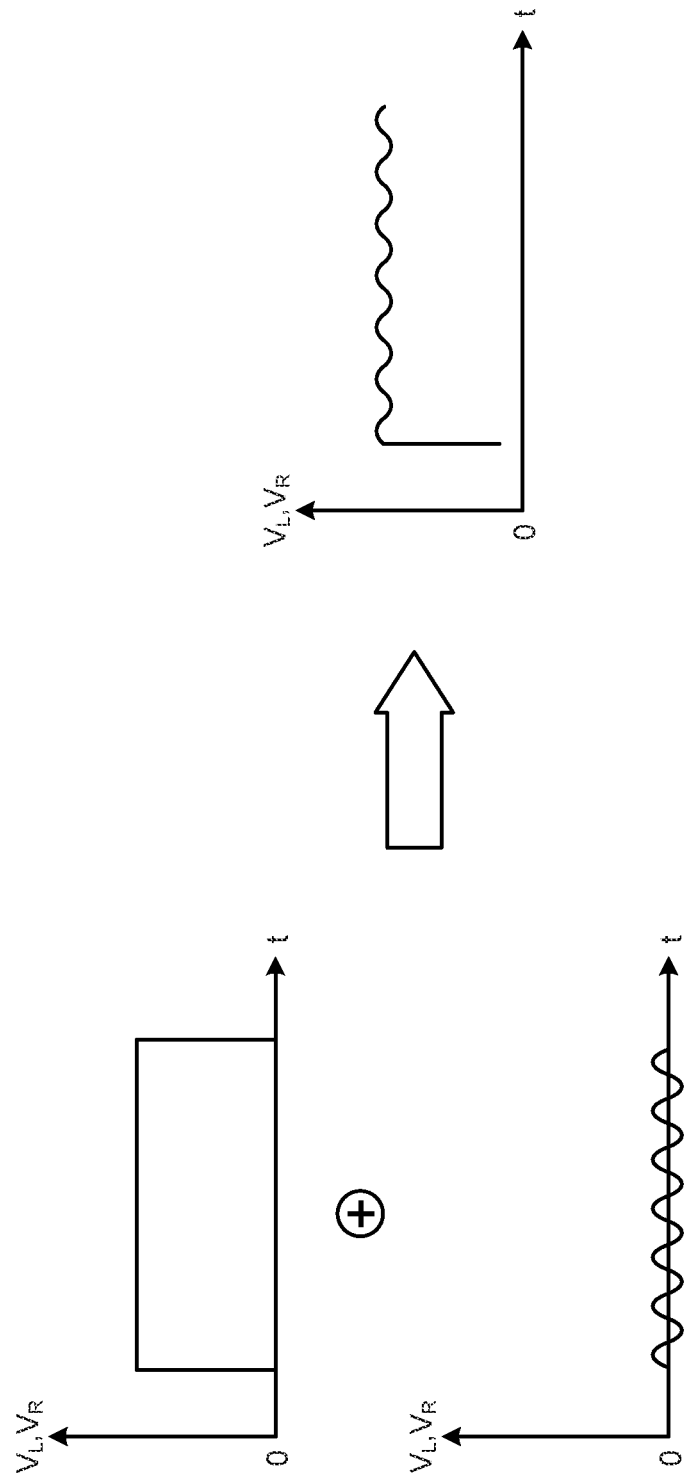
FIG. 18 is a conceptual diagram for explaining a temporal change in angular velocity of a wheel based on motion data according to the embodiment.

Next, a temporal change in the angular velocity of the wheel in the motion data will be conceptually described with reference to FIG. 18. FIG. 18 is a conceptual diagram for describing a temporal change in the angular velocity of the wheel based on the motion data according to the embodiment. In the example illustrated in FIG. 18, the target value of the angular velocity of the left wheel of the autonomous mobile body 10 is indicated by VL, and the target value of the angular velocity of the right wheel is indicated by VR. Specifically, FIG. 18 illustrates a case where the motion data is a posture operation (motion data M11) expressing joy of the autonomous mobile body 10.

The diagram illustrated in the upper left of FIG. 18 is a graph conceptually illustrating the temporal change in the angular velocity of the left and right wheels necessary for the forward traveling motion of the autonomous mobile body 10. As illustrated in the upper left of FIG. 18, the angular velocity of the left and right wheels necessary for the forward traveling motion of the autonomous mobile body 10 have a constant value that does not change with time.

A diagram illustrated in the lower left of FIG. 18 is a graph conceptually illustrating the temporal change in the angular velocity of the left and right wheels necessary for the motion data M11 of the autonomous mobile body 10. As illustrated in the lower left of FIG. 18, the angular velocity of the left and right wheels necessary for realizing the motion data M11 of the autonomous mobile body 10 are indicated by the sine signal of a constant cycle.

The right diagram of FIG. 18 is a graph conceptually illustrating a temporal change in the angular velocity of the left and right wheels obtained by superimposing the angular velocity of the wheel illustrated in the upper left of FIG. 18 and the angular velocity of the wheel illustrated in the lower left of FIG. 18. The operation controller 175 controls the angular velocity of the left and right wheels such that the angular velocity of the left and right wheels necessary for the forward traveling motion and the angular velocity of the left and right wheels necessary for realizing the motion data M11 are superimposed on each other to obtain an angular velocity as illustrated on the right side of FIG. 18. As a result, the autonomous mobile body 10 controls the posture operation of the autonomous mobile body 10 so as to it performs the forward traveling motion while swinging back and forth from the reference posture angle.

1.3.1.6. Functional Configuration Example of Operation Controller

Figure 19:
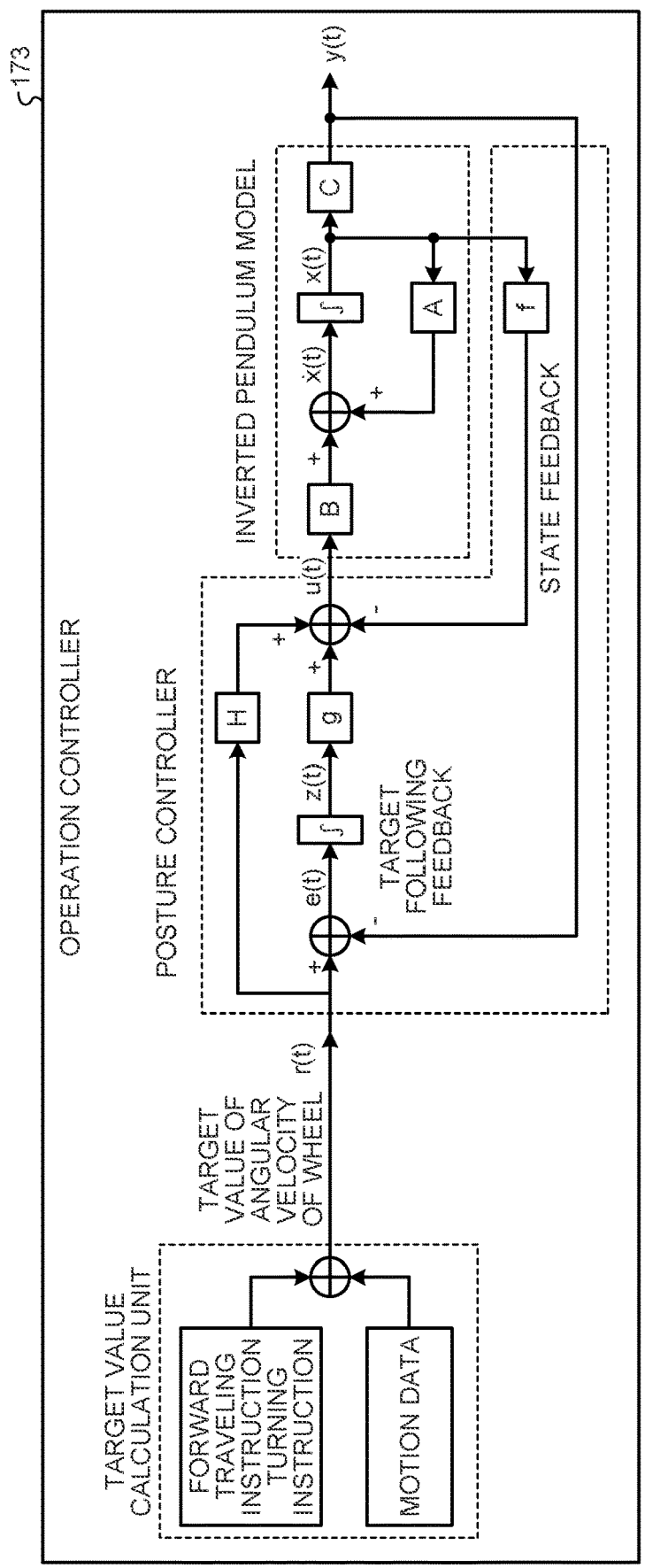
FIG. 19 is a block diagram illustrating a functional configuration example of an operation controller according to the embodiment.

Next, a block diagram illustrating a functional configuration example of the operation controller will be described with reference to FIG. 19. FIG. 19 is a block diagram illustrating a functional configuration example of the operation controller according to the embodiment. In the example illustrated in FIG. 19, the operation controller 175 includes a target calculation unit, a posture controller, and an inverted pendulum model unit.

The target calculation unit calculates a target moving distance and a target speed of the translational motion or the turning motion based on an instruction of the translational motion or an instruction of the turning motion with respect to the autonomous mobile body 10, and converts the target movement distance and the target speed into target values (hereinafter, also referred to as target wheel angular velocity) of the angular velocity of the left and right wheels. For example, the angular velocity of the wheel illustrated in the upper left of FIG. 18 corresponds to the target wheel angular velocity converted from the target movement distance and the target speed of the translational motion. In addition, the target calculation unit calculates a posture angle and a posture angular velocity necessary for realizing the motion data of the autonomous mobile body 10, and converts the posture angle and the posture angular velocity into target values (hereinafter, also referred to as target wheel angular velocity) of the angular velocity of the left and right wheels. For example, the angular velocity of the wheel illustrated in the lower left of FIG. 18 corresponds to the target wheel angular velocity converted from the posture angle and the posture angular velocity necessary for realizing the motion data M11. Subsequently, the target calculation unit sequentially transmits the converted target wheel angular velocity to the posture controller. For example, the angular velocity of the wheel illustrated on the right side of FIG. 18 corresponds to the target wheel angular velocity sequentially transmitted to the posture controller.

The posture controller and the inverted pendulum model unit control the posture operation of the autonomous mobile body 10 so that the autonomous mobile body 10 follows the instructed target wheel angular velocity while maintaining the inverted state.

The inverted pendulum model unit is obtained by expressing a motion equation (differential equation) of the system by a matrix or a vector, and is referred to as a state space representation. At this time, x(t) is referred to as a state variable vector, A is referred to as a system coefficient matrix, B is referred to as an input vector, and C is referred to as an output vector. Here, x(t) is an internal parameter representing an internal state of the system that changes from moment to moment. Specifically, x(t) represents the posture angle and the differentiation of the posture angle of the inverted pendulum, the translation component and the differentiation of the translation component of the inverted pendulum, and the turning component and the differentiation of the turning component. Further, u(t) is an input to the inverted pendulum, and specifically represents an applied voltage value to the motor which is the left and right wheel portions of the inverted pendulum. In addition, u(t) is referred to as an amount of operation. Further, y(t) is an output of the system, specifically, a translation component and a turning component of the wheel.

Here, assuming that ϕR is the rotation angle of the right wheel, ϕL is the rotation angle of the left wheel, ϕC is the rotation angle of the virtual center wheel, Ψ is the turning angle of the body of the inverted pendulum, r is the wheel radius, and d is the distance from the center of the autonomous mobile body 10 to the wheel, the translation component and the turning component are uniquely obtained from the wheel angles of the left and right wheels by the following equations.

$$\text{Translation component: } \varphi_c = \frac{\varphi_L + \varphi_R}{2}$$

$$\text{Turning component: } \psi = \frac{r}{2d}(\varphi_R - \varphi_L)$$

The state feedback is configured to perform feedback by multiplying the state variable vector x(t) by the vector f. When the amount of operation u(t) is added to the inverted pendulum to be controlled or when the internal state of the system changes (when autonomous mobile body 10 is touched by user and the posture angle changes, or the like), it has a role of performing feedback to the amount of operation at the next time so that the system quickly transitions to a stable state. Here, the stable state means that the inverted pendulum does not fall.

The target calculation unit periodically transmits the target value r(t) of the angular velocity of the left and right wheels to the inverted pendulum system every hour. As described above, the translation component and the turning component are uniquely obtained by calculation from the angle of the left and right wheels by the above equation. In the posture controller, control is performed using the translation component and the turning component as targets. Here, the target following feedback is responsible for causing the state of the system to follow its target value. Specifically, the deviation "e(t)=r(t)−y(t)" between the target value r(t) and the output y(t) to be controlled is integrated to obtain z(t), and the result obtained by multiplying z(t) by the gain g is referred to as target following feedback. In this manner, the integration ensures that the controlled object reliably approaches the final target value with enough time.

However, the feedback system generally has a problem that the reaction from the change in the target to the target following is slow. Therefore, a target following feedforward term is added to compensate for this. The target following feedforward term is configured to multiply the target value r(t) by the gain H to add the result to the amount of operation. As a result, it is possible to quickly respond when the target changes and enhance the responsiveness.

(Communication Unit 180)

The communication unit 180 according to the present embodiment is realized by, for example, an NIC or the like. Then, the communication unit 180 is connected to the network N in a wired or wireless manner to transmit and receives information to and from an external information processing server, for example.

The functional configuration example of the autonomous mobile body 10 according to an embodiment of the present disclosure is described above. Note that the above-described configuration described with reference to FIG. 14 is merely an example, and the functional configuration of the autonomous mobile body 10 according to an embodiment of the present disclosure is not limited to such an example. For example, the operation of the autonomous mobile body 10 according to the present embodiment may be controlled by an information processing server that communicates with the autonomous mobile body 10. In this case, the autonomous mobile body 10 may transmit the sensor information to the information processing server via the communication unit 180 described above, and may receive the control signal from the information processing server. The functional configuration of the autonomous mobile body 10 according to the present embodiment can be flexibly modified according to the shape of the autonomous mobile body 10 or the like.

1.4. Details of Other Posture Control

Next, other posture control of the autonomous mobile body 10 by the operation controller 173 according to the present embodiment will be described in detail. As described above, one of the features of the operation controller 173 according to the present embodiment is to perform control so that the autonomous mobile body 10 performs the moving operation in the state of maintaining the frontward tilting posture. According to the above-described function of the operation controller 173 according to the present embodiment, it is possible to realize rich motion expression closer to a real living organism by causing the autonomous mobile body 10 to have directionality.

Figure 20:
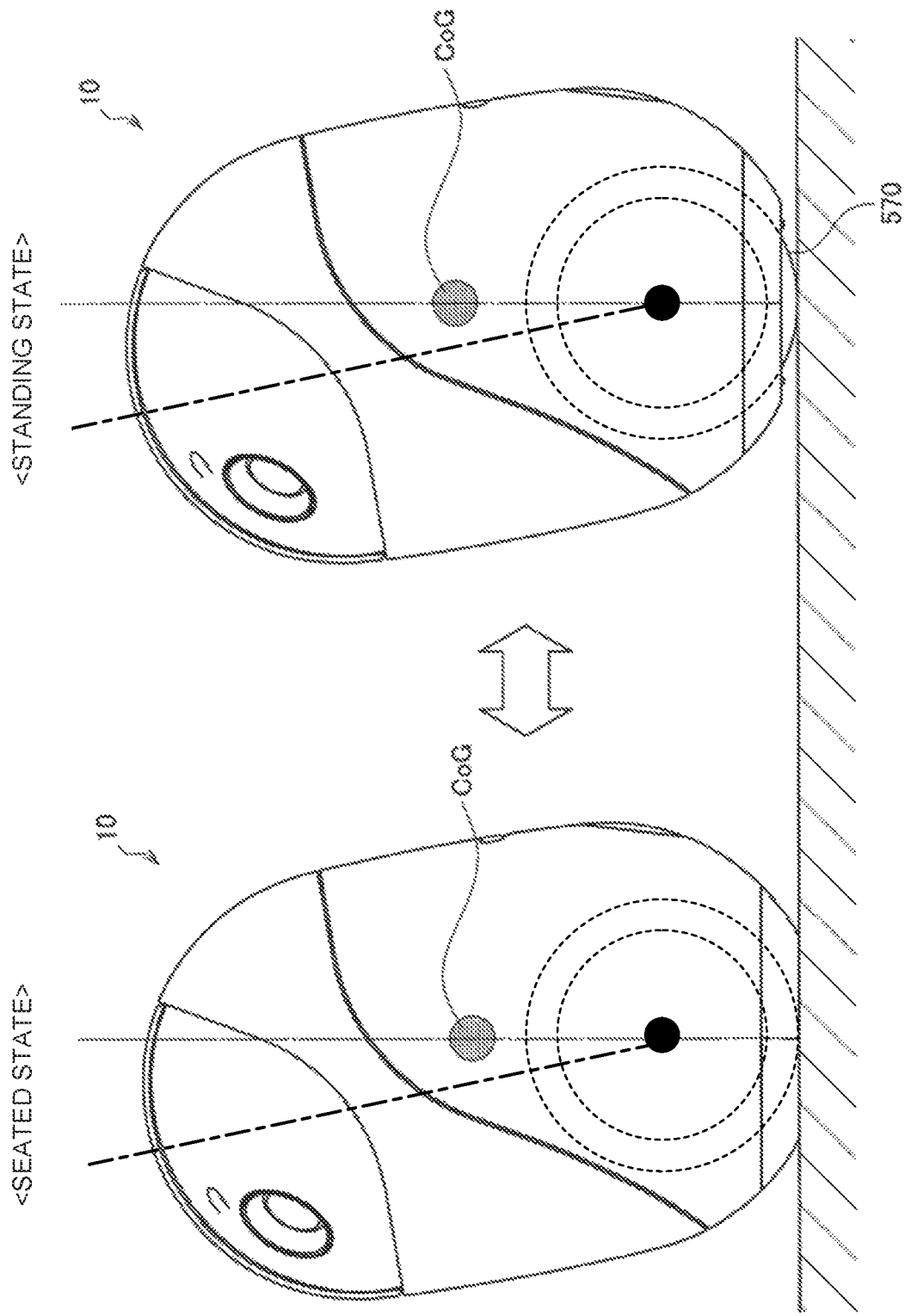
FIG. 20 is a diagram for describing posture control during a stay and during a moving operation according to the embodiment.

Furthermore, the operation controller 173 according to the present embodiment may perform different posture control during a stay and during a moving operation. FIG. 20 is a diagram for describing posture control during a stay and during a moving operation according to the present embodiment. The left side of FIG. 20 illustrates a case where the autonomous mobile body 10 does not perform the moving operation and stays on the spot. At this time, the operation controller 175 according to the present embodiment may store the wheel 570 inside the main body of the autonomous mobile body 10, and may stop the autonomous mobile body 10 in the seated state.

According to the above control by the operation controller 175 according to the present embodiment, in a case where the moving operation is not necessary, the autonomous mobile body 10 is firmly stopped by storing the wheel 570 inside the main body and bringing the bottom portion into contact with the installation surface, and it is possible to prevent wobbling during a stay like a general robot device. Furthermore, according to such control, the autonomous mobile body 10 can be stabilized even without gyro control, and power consumption required for gyro control can be effectively reduced.

On the other hand, the right side of FIG. 20 illustrates a case where the autonomous mobile body performs a moving operation. At this time, the operation controller 175 according to the present embodiment protrudes the wheel 570 to the outside of the main body of the autonomous mobile body 10 to maintain the standing state, and performs drive control and gyro control of the wheel 570.

Note that, as described above, the operation controller 175 causes the autonomous mobile body 10 to maintain the frontward tilting posture by controlling the center of gravity CoG of the autonomous mobile body 10 to be positioned vertically above the wheel 570. At this time, the operation controller 175 may adjust the position of the wheel 570 in accordance with the position of the center of gravity CoG.

According to the above control by the operation controller 175 according to the present embodiment, it is possible to cause the autonomous mobile body 10 to perform a moving operation in a state where the frontward tilting posture is maintained, and even in a case where the autonomous mobile body 10 has a relatively simple outer shape, it is possible to realize a rich motion expression closer to a real living organism.

Figure 21:
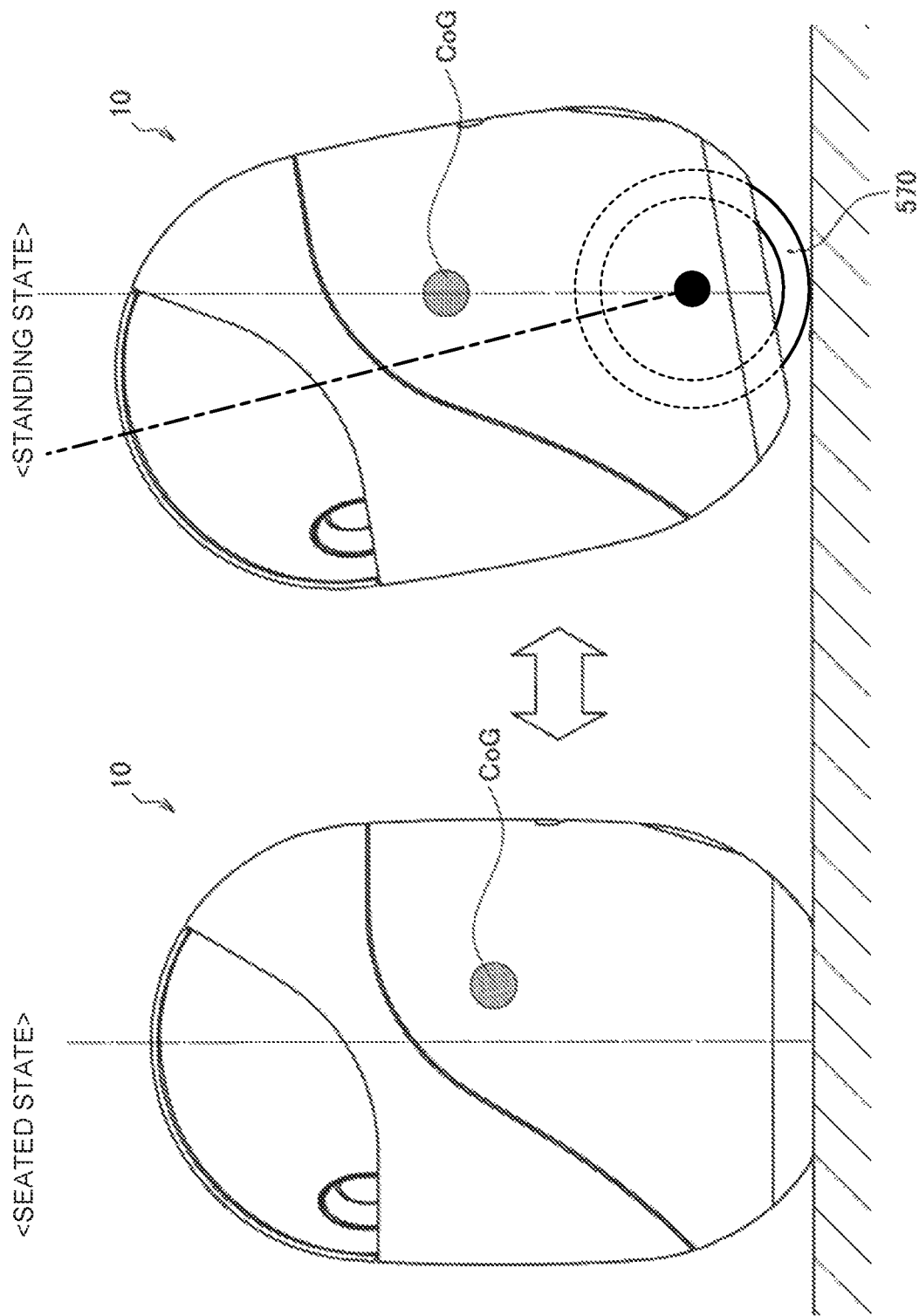
FIG. 21 is a diagram for describing posture control during a stay and during a moving operation according to the embodiment.

Note that, in the example illustrated in FIG. 20, the case where the autonomous mobile body 10 maintains the frontward tilting posture even in the seated state has been illustrated, but the posture in the seated state according to the present embodiment is not limited to such an example. FIG. 21 illustrates an example of a case where the autonomous mobile body 10 according to the present embodiment takes an upright posture in a seated state. In the example illustrated in FIG. 21, it can be seen that the angle of the bottom face portion is perpendicular to the body axis of the main body. As described above, the posture of the autonomous mobile body 10 in the seated state can be appropriately adjusted by changing the angle of the bottom face portion.

As illustrated in FIG. 20, when the angle of the bottom face portion is made oblique with respect to the body axis so that the front portion opens, it is possible to further reduce the possibility that the lower front portion comes into contact with the traveling surface during a moving operation. On the other hand, as illustrated in FIG. 21, when the angle of the bottom face portion is formed perpendicular to the body axis, an effect of more stably stopping the autonomous mobile body 10 in the seated state is expected.

However, in this case, as illustrated on the left side of FIG. 21, in the seated state, the center of gravity CoG of the autonomous mobile body 10 is shifted from the rotation axis of the wheel 570. Here, in a case where no control is performed, the main body of the autonomous mobile body 10 moves rearward due to the center of gravity CoG at the moment of transition to the standing state.

In order to prevent the above situation, the operation controller 175 according to the present embodiment may rotate the wheel 570 based on the deviation amount between the center of gravity CoG of the autonomous mobile body 10 and the rotation axis of the wheel 570 in the vertical direction at the time of transition from the seated state to the standing state.

Figure 22:
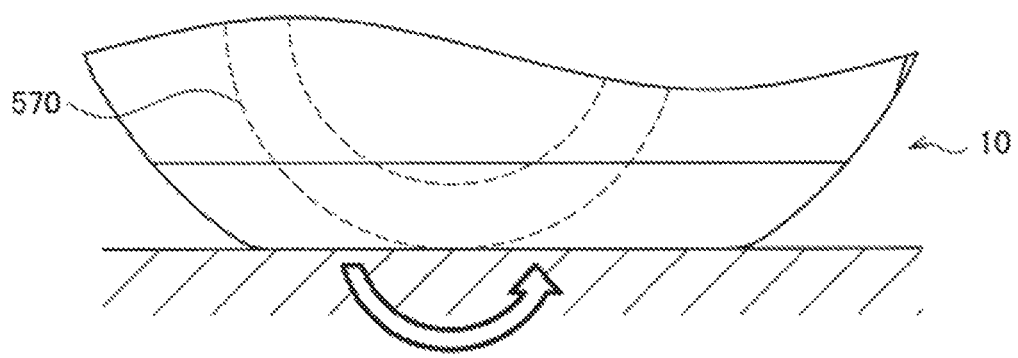
FIG. 22 is a diagram for describing wheel control at the time of transition to a standing state according to the embodiment.

FIG. 22 is a diagram for describing the wheel control at the time of transition to the standing state according to the present embodiment. FIG. 22 illustrates a situation when the wheel 570 of the autonomous mobile body 10 comes into contact with the traveling surface as it protrudes. At this time, the operation controller 175 according to the present embodiment may perform the gyro control after rotating the wheel 570 by the deviation amount+a and positioning the center of gravity CoG above of the rotation axis of the wheel 570 in the vertical direction. According to the above control by the operation controller 175, even when a deviation occurs between the center of gravity and the rotation axis of the wheel 570 in the seated state, the deviation is offset, and the autonomous mobile body 10 can be stably transitioned to the standing state without moving backward.

Figure 23:
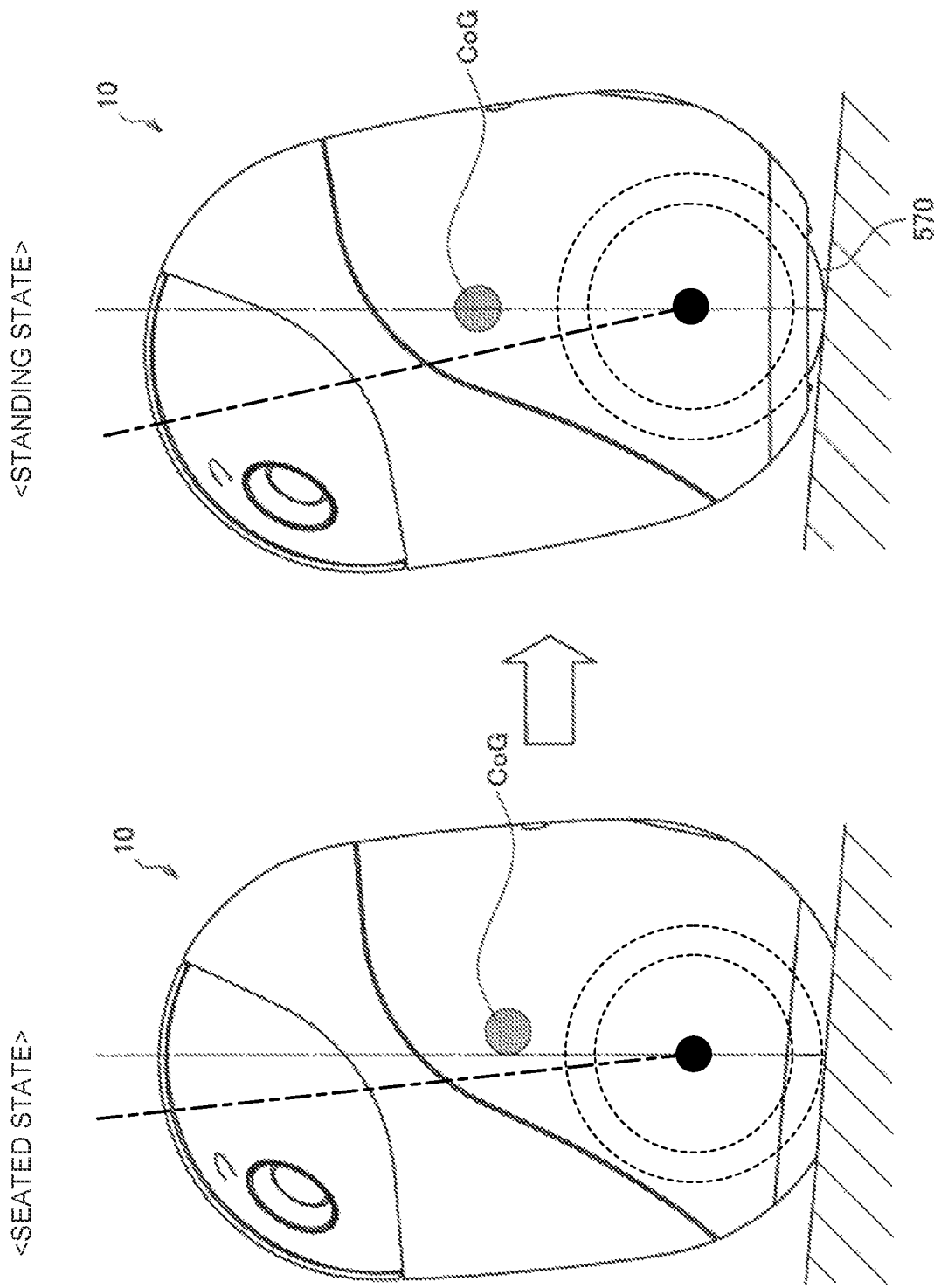
FIG. 23 is a diagram for describing wheel control at the time of transition to a standing state according to the embodiment.

In the above description, the case where by forming the bottom face portion perpendicular to the body axis, the deviation occurs between the center of gravity and the rotation axis is described as an example. However, the deviation as described above can also occur when the traveling surface has an inclination as illustrated in FIG. 23. In the case of the example illustrated in FIG. 23, the angle of the bottom face portion is similar to that of the example illustrated in FIG. 20, but since the traveling surface is inclined, the center of gravity CoG in the seated state deviates from the rotation axis of the wheel 570.

However, even in this case, as described with reference to FIG. 22, the operation controller 175 can stably transition the autonomous mobile body 10 to the standing state without moving backward by rotating the wheel 570 based on the deviation amount between the center of gravity CoG and the rotation axis of the wheel 570 in the vertical direction.

1.5. Procedure of Information Processing According to Embodiment

Figure 24:
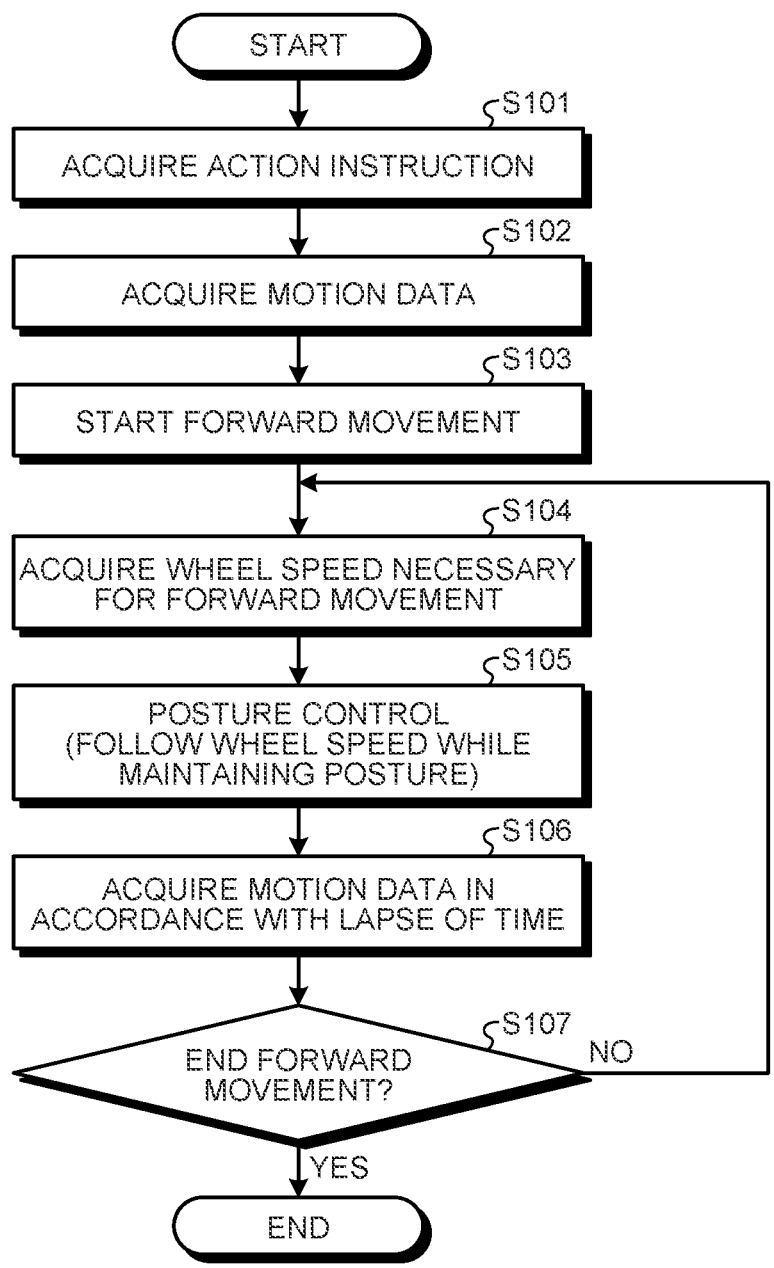
FIG. 24 is a flowchart illustrating an information processing procedure according to the embodiment.

Next, a procedure of information processing according to the embodiment of the present disclosure will be described with reference to FIG. 24. FIG. 24 is a flowchart illustrating a procedure of information processing according to the embodiment of the present disclosure.

In the example illustrated in FIG. 24, the autonomous mobile body 10 acquires an action instruction. For example, the autonomous mobile body 10 acquires an action instruction to move forward (move straight) in the direction of the user (step S101).

Subsequently, when acquiring the action instruction, the autonomous mobile body 10 acquires motion data according to the emotion of the autonomous mobile body (step S102). Subsequently, when acquiring the motion data, the autonomous mobile body 10 starts forward movement toward the direction of the user (step S103).

Subsequently, when starting the forward movement, the autonomous mobile body 10 acquires the wheel speed necessary for the forward movement (step S104). Subsequently, when acquiring the wheel speed, the autonomous mobile body 10 performs posture control so as to follow the wheel speed while maintaining the inverted state (step S105). Subsequently, the autonomous mobile body 10 acquires motion data in accordance with the lapse of time (step S106).

Subsequently, the autonomous mobile body 10 determines whether to end the forward movement (step S107). When determining that the forward movement is ended (Yes in step S107), the autonomous mobile body 10 ends the forward movement. On the other hand, when determining that the forward movement is not ended (No in step S107), the autonomous mobile body 10 acquires the wheel speed necessary for the forward movement again (step S104).

1.6. Modification of Embodiment

1.6.1. Compatibility Between Posture Angle and Rotation Angle of Wheel

In the above-described embodiment, the example in which the motion data is designated by the temporal change in the posture angle of the autonomous mobile body 10 is described. However, the posture angle (or posture angular velocity) of the autonomous mobile body 10 and the rotation angle (or angular velocity) of the left and right wheels of the autonomous mobile body 10 have a one-to-one relationship for a certain autonomous mobile body 10. Therefore, instead of the posture angle, the rotation angles (or angular velocity) of the left and right wheels may be used as the item of the "angle (°)" of the posture operation of the motion data storage unit 162 illustrated in FIG. 15. Furthermore, the operation controller 175 may control the posture of the autonomous mobile body 10 based on a temporal change in the rotation angle (or angular velocity) of the left and right wheels instead of the posture angle.

1.6.2. Motion Data at the Time of Softly Touched

Furthermore, the operation controller 175 may control the posture operation of the autonomous mobile body based on the user information about the user of the autonomous mobile body located around the autonomous mobile body. Specifically, the operation controller 175 controls the posture operation of the autonomous mobile body based on the image information indicating the face of the user, the interactive information indicating the content of the interaction with the user, or the contact information indicating the manner of contact of the user with the autonomous mobile body as the user information. For example, the detection unit 171 learns in advance the pattern of the angular velocity and the angular acceleration when the user lightly (softly) touches the head of the autonomous mobile body 10 several times with the finger. When the angular velocity or the angular acceleration of the pattern learned in advance is detected, the detection unit 171 detects that the user swings to the autonomous mobile body 10.

When the operation controller 175 detects that the detection unit 171 is softly touched by the user, the operation controller 175 controls the posture operation of the autonomous mobile body 10 so that while moving in the direction opposite to the softly touched direction, the component in the turning direction is gradually integrated to show an expression of a feeling of ticklish. In addition, the operation controller 175 controls the posture operation of the autonomous mobile body 10 so as to express a gesture as if confused saying, "whoa" when the autonomous mobile body 10 returns from the state of softly touched to the stable posture. For example, when the autonomous mobile body 10 returns from the state softly touched to the stable posture, the operation controller 175 controls the posture operation of the autonomous mobile body 10 so that it vibrates at a predetermined frequency (for example, 3 Hz) by a predetermined amplitude angle (for example, 3°) around the reference posture angle θ corresponding to the reference posture with the axle of the left and right wheels of the autonomous mobile body 10 as the rotation axis COW.

1.6.3. Motion Data Expressing Confusion (Panicking)

When the emotion of the autonomous mobile body 10 corresponds to confusion (panicking), the operation controller 175 controls the posture operation of the autonomous mobile body 10 so as to express a gesture as if intentionally falling down before the autonomous mobile body 10 reaches the target position. Specifically, when the emotion of the autonomous mobile body 10 corresponds to confusion (panicking), the operation controller 175 controls the forward traveling motion of the autonomous mobile body 10, and controls the posture operation of the autonomous mobile body 10 so that after a predetermined time (for example, after 500 ms) has passed since it rotated in the traveling direction by a third amplitude angle (for example, 5°) around the reference posture angle θ corresponding to the reference posture with the axle of the left and right wheels of the autonomous mobile body 10 as the rotation axis COW before the autonomous mobile body 10 reaches the target position, it rotates in the direction opposite to the traveling direction by an angle larger than the third amplitude angle (for example, 20°) around the reference posture angle θ corresponding to the reference posture with the axle of the left and right wheels of the autonomous mobile body 10 as the rotation axis COW.

1.6.4. Motion Data Expressing Deterioration (Feeble)

When the emotion of the autonomous mobile body 10 corresponds to deterioration (feeble), the operation controller 175 controls the posture operation of the autonomous mobile body 10 so as to express a gesture as if walking with zigzag. Specifically, when the emotion of the autonomous mobile body 10 corresponds to deterioration (feeble), the operation controller 175 controls the forward traveling motion of the autonomous mobile body 10, and controls the posture operation of the autonomous mobile body 10 so as to alternately perform control of causing the autonomous mobile body to advance with the other side of the autonomous mobile body 10 advancing farther than one side of the autonomous mobile body in the left and right direction and control of causing the autonomous mobile body 10 to advance with one side of the autonomous mobile body advancing farther than the other side of the autonomous mobile body in the left and right direction. More specifically, the operation controller 175 controls the posture operation of the autonomous mobile body 10 by alternately and periodically temporally changing the rotation angle or the rotation angular velocity of the left and right wheels of the autonomous mobile body 10.

Furthermore, the operation controller 175 may control the posture operation of the autonomous mobile body 10 based on the state information indicating the internal state of the autonomous mobile body 10. Specifically, the operation controller 175 controls the posture operation of the autonomous mobile body 10 based on the temperature information indicating the temperature in the body of the autonomous mobile body 10 or the information indicating the remaining battery level of the autonomous mobile body 10 as the state information.

For example, the detection unit 171 detects that the temperature in the body of the autonomous mobile body 10 exceeds a predetermined threshold value. When detection unit 171 detects that the temperature in the body of the autonomous mobile body 10 exceeds a predetermined threshold value, the recognition unit 172 estimates that the emotion of the autonomous mobile body 10 corresponds to deterioration (feeble). When the recognition unit 172 estimates that the emotion of the autonomous mobile body corresponds to deterioration (feeble), the acquisition unit 174 refers to the motion data storage unit 162 to acquire motion data (not illustrated) corresponding to the deterioration (feeble) that is the emotion of the autonomous mobile body. When the motion data corresponding to the deterioration (feeble) is acquired by the acquisition unit 174, the operation controller 175 controls the posture operation of the autonomous mobile body based on the motion data corresponding to the deterioration (feeble). Note that the operation controller 175 may express a gesture as if walking with zigzag while a voice such as "I have a slight fever" or "I'm tired" is output by the audio output unit 140.

In addition, the detection unit 171 detects that the remaining battery level of the autonomous mobile body 10 is equal to or less than a predetermined threshold value. When the detection unit 171 detects that the remaining battery level of the autonomous mobile body 10 is equal to or less than a predetermined threshold value, the recognition unit 172 estimates that the emotion of the autonomous mobile body 10 corresponds to deterioration (feeble). When the recognition unit 172 estimates that the emotion of the autonomous mobile body corresponds to deterioration (feeble), the acquisition unit 174 refers to the motion data storage unit 162 to acquire motion data (not illustrated) corresponding to the deterioration (feeble) that is the emotion of the autonomous mobile body. When the motion data corresponding to the deterioration (feeble) is acquired by the acquisition unit 174, the operation controller 175 controls the posture operation of the autonomous mobile body based on the motion data corresponding to the deterioration (feeble). Note that the operation controller 175 may express a gesture as if walking with zigzag while a voice such as "I'm hungry" or "I'm dizzy" is output by the audio output unit 140.

2. Effects According to Present Disclosure

As described above, the information processing device (the autonomous mobile body 10 in the embodiment) according to the present disclosure includes the operation controller (the operation controller 175 in the embodiment). The operation controller 175 controls the moving operation of the autonomous mobile body that travels while maintaining the inverted state, and controls the posture operation of the autonomous mobile body that temporally changes from the reference posture in the inverted state.

As a result, the information processing device can simultaneously perform control of maintaining the inverted state of the autonomous mobile body and control of temporally changing the posture of the autonomous mobile body. That is, since the information processing device can change in any manner the posture of the autonomous mobile body while maintaining the inverted state of the autonomous mobile body, it is possible to show more expressions.

Therefore, the information processing device can further enrich the motion expression of the autonomous mobile body.

Furthermore, the information processing device (the autonomous mobile body 10 in the embodiment) according to the present disclosure further includes an acquisition unit (the acquisition unit 174 in the embodiment). The acquisition unit 174 acquires motion data corresponding to the posture operation of the autonomous mobile body. The operation controller 175 controls the posture operation of the autonomous mobile body based on the motion data acquired by the acquisition unit 174.

As a result, the information processing device can express various posture operations of the autonomous mobile body.

Furthermore, the acquisition unit 174 acquires motion data according to the emotion of the autonomous mobile body. The operation controller 175 controls the posture operation of the autonomous mobile body based on the motion data, according to the emotion, acquired by the acquisition unit 174.

As a result, the information processing device can express various posture operations according to the emotion of the autonomous mobile body.

In addition, the autonomous mobile body has wheels on the left and right with respect to the traveling direction, and the operation controller 175 controls the posture operation of the autonomous mobile body based on motion data corresponding to the posture operation of vibrating around the reference posture angle corresponding to the reference posture with an axle of the left and right wheels of the autonomous mobile body as a rotation axis.

As a result, the information processing device can express the posture operation of vibrating in the traveling direction while maintaining the inverted state of the autonomous mobile body having the inverted pendulum structure.

Furthermore, the operation controller 175 controls the moving operation of the autonomous mobile body including at least one of the front-back motion, the turning motion, or the rotation motion, and controls the posture operation of the autonomous mobile body so that the autonomous mobile body vibrates at a predetermined frequency by a predetermined amplitude angle around a reference posture angle corresponding to the reference posture with the axle of the left and right wheels of the autonomous mobile body as the rotation axis.

As a result, the information processing device can control the moving operation of the autonomous mobile body including at least one of the front-back motion, the turning motion, or the rotation motion, and can control the posture operation of the autonomous mobile body, so that more various posture operations of the autonomous mobile body can be expressed.

Furthermore, the operation controller 175 controls a forward traveling motion of the autonomous mobile body, and controls a posture operation of the autonomous mobile body so that the autonomous mobile body vibrates at a first frequency by a first amplitude angle around a reference posture angle corresponding to the reference posture with an axle of the left and right wheels of the autonomous mobile body as a rotation axis when an emotion of the autonomous mobile body corresponds to joy, and the operation controller 175 controls a posture operation of the autonomous mobile body so that the autonomous mobile body vibrates at a frequency smaller than the first frequency by an amplitude angle larger than the first amplitude angle around a reference posture angle corresponding to the reference posture with the axle of the left and right wheels of the autonomous mobile body as the rotation axis when an emotion of the autonomous mobile body corresponds to fun.

As a result, the information processing device can show the emotion of joy of the autonomous mobile body by a change in posture. Furthermore, the information processing device can show the emotion of fun of the autonomous mobile body by a change in posture different from that of joy.

Furthermore, the operation controller 175 controls a turning motion of the autonomous mobile body, and controls a posture operation of the autonomous mobile body so that the autonomous mobile body vibrates at a second frequency by a second amplitude angle around a reference posture angle corresponding to the reference posture with an axle of the left and right wheels of the autonomous mobile body as a rotation axis when an emotion of the autonomous mobile body corresponds to anger, and controls a posture operation of the autonomous mobile body so that the autonomous mobile body vibrates at a frequency smaller than the second frequency by an amplitude angle larger than the second amplitude angle around a reference posture angle corresponding to the reference posture with the axle of the left and right wheels of the autonomous mobile body as the rotation axis when an emotion of the autonomous mobile body corresponds to sadness.

As a result, the information processing device can express the emotion of anger of the autonomous mobile body by a change in posture. Furthermore, the information processing device can show an emotion of sadness of the autonomous mobile body by a change in posture different from that of anger.

In addition, when an emotion of the autonomous mobile body corresponds to confusion, the operation controller 175 controls a forward traveling motion of the autonomous mobile body, and controls a posture operation of the autonomous mobile body so that after a predetermined time has passed since the autonomous mobile body rotated in a traveling direction by a third amplitude angle around a reference posture angle corresponding to the reference posture with an axle of the left and right wheels of the autonomous mobile body as a rotation axis before the autonomous mobile body reaches a target position, the autonomous mobile body rotates in a direction opposite to the traveling direction by an angle larger than the third amplitude angle around a reference posture angle corresponding to the reference posture with the axle of the left and right wheels of the autonomous mobile body as the rotation axis.

As a result, the information processing device can show an emotion of confusion (panicking) of the autonomous mobile body, for example, by a gesture of rolling.

Furthermore, in a case where the emotion of the autonomous mobile body corresponds to deterioration, the operation controller 175 controls the forward traveling motion of the autonomous mobile body, and controls the posture operation of the autonomous mobile body so as to alternately perform control of causing the autonomous mobile body to advance with the other side of the autonomous mobile body advancing farther than one side of the autonomous mobile body in the left and right direction and control of causing the autonomous mobile body to advance with one side of the autonomous mobile body advancing farther than the other side of the autonomous mobile body in the left and right direction.

As a result, the information processing device can show an emotion of deterioration (feeble) of the autonomous mobile body by, for example, a gesture as if walking with zigzag.

Furthermore, the operation controller 175 controls the posture operation of the autonomous mobile body by alternately and periodically temporally changing the rotation angle or the rotation angular velocity of the left and right wheels of the autonomous mobile body.

As a result, the information processing device can show various expressions of the autonomous mobile body that is the two-wheeled inverted pendulum.

Furthermore, the operation controller 175 controls the posture operation of the autonomous mobile body based on the user information about the user of the autonomous mobile body located around the autonomous mobile body. Furthermore, the operation controller 175 controls the posture operation of the autonomous mobile body based on, as the user information, the image information indicating the face of the user, the interactive information indicating the content of the interaction with the user, or the contact information indicating the manner of contact of the user with the autonomous mobile body.

As a result, the information processing device can show various expressions according to the user information about the user of the autonomous mobile body.

Furthermore, the operation controller 175 controls the posture operation of the autonomous mobile body based on the state information indicating the internal state of the autonomous mobile body. The operation controller 175 controls the posture operation of the autonomous mobile body based on temperature information indicating the temperature in the body of the autonomous mobile body or information indicating the remaining battery level of the autonomous mobile body as the state information.

As a result, the information processing device can show various expressions according to the state information indicating the internal state of the autonomous mobile body.

Furthermore, the operation controller 175 controls the posture operation of the autonomous mobile body so that the reference posture in the inverted state is the frontward tilting posture.

As a result, the information processing device can control the posture operation of the autonomous mobile body while maintaining the state of the inverted pendulum.

3. Hardware Configuration

Figure 25:
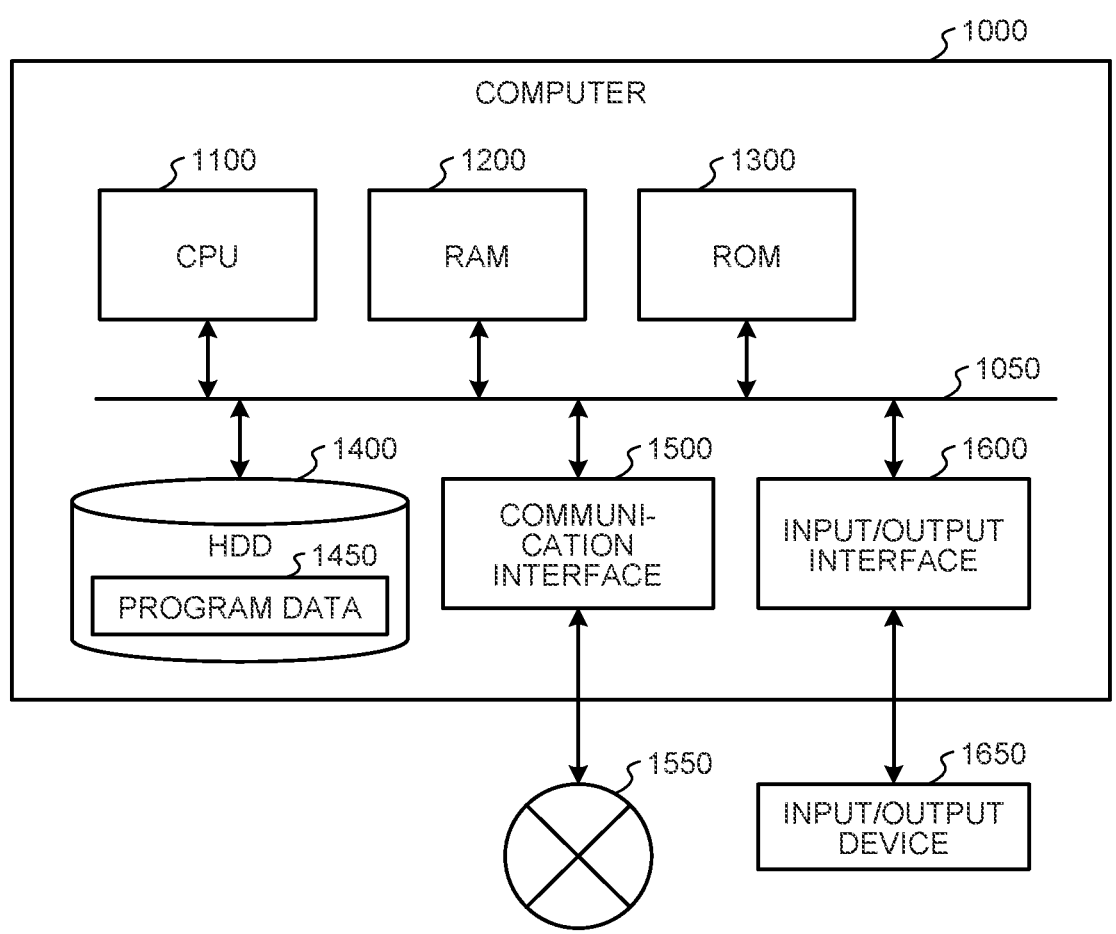
FIG. 25 is a hardware configuration diagram illustrating an example of a computer that implements functions of an information processing device.

The information device such as the autonomous mobile body 10 according to the embodiment and the modifications described above is realized by the computer 1000 having a configuration as illustrated in FIG. 25, for example. FIG. 25 is a hardware configuration diagram illustrating an example of the computer 1000 that implements the functions of the information processing device such as the autonomous mobile body 10. Hereinafter, the autonomous mobile body 10 according to the embodiment will be described as an example. The computer 1000 includes a CPU 1100, a RAM 1200, a read only memory (ROM) 1300, a hard disk drive (HDD) 1400, a communication interface 1500, and an input/output interface 1600. Respective units of the computer 1000 are connected by a bus 1050.

The CPU 1100 operates based on a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a computer-readable recording medium that non-transiently records programs executed by the CPU 1100, data used by the programs, and the like. Specifically, the HDD 1400 is a recording medium that records an information processing program according to the present disclosure which is an example of program data 1450.

The communication interface 1500 is an interface for the computer 1000 to be connected to an external network 1550 (for example, the Internet). For example, the CPU 1100 receives data from another device or transmits data generated by the CPU 1100 to another device via the communication interface 1500.

The input/output interface 1600 is an interface that connects an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the autonomous mobile body 10 according to the embodiment, the CPU 1100 of the computer 1000 realizes the functions of the controller 170 and the like by executing the information processing program loaded on the RAM 1200. In addition, the HDD 1400 stores the information processing program according to the present disclosure and data in the storage unit 160. The CPU 1100 reads the program data 1450 from the HDD 1400 and executes the program data, but as another example, the program may be acquired from another device via the external network 1550.

The present technology may also be configured as below.

(1)

An information processing device comprising:
an operation controller that controls a moving operation of an autonomous mobile body that travels while maintaining an inverted state, and controls a posture operation of the autonomous mobile body that temporally changes from a reference posture in the inverted state.

(2)

The information processing device according to (1), further comprising:
an acquisition unit that acquires motion data corresponding to a posture operation of the autonomous mobile body, wherein
the operation controller
controls a posture operation of the autonomous mobile body based on the motion data acquired by the acquisition unit.

(3)

The information processing device according to (2), wherein
the acquisition unit
acquires the motion data according to an emotion of the autonomous mobile body, and wherein the operation controller
controls a posture operation of the autonomous mobile body based on the motion data, according to the emotion, acquired by the acquisition unit.

(4)

The information processing device according to (2) or (3), wherein
the autonomous mobile body includes wheels on right and left sides with respect to a traveling direction, and wherein
the operation controller
controls a posture operation of the autonomous mobile body based on the motion data corresponding to a posture operation of vibrating around a reference posture angle corresponding to the reference posture with an axle of left and right wheels of the autonomous mobile body as a rotation axis.

(5)

The information processing device according to (4), wherein
the operation controller
controls a moving operation of the autonomous mobile body including at least one of a front-back motion, a turning motion, and a rotation motion, and controls a posture operation of the autonomous mobile body so that the autonomous mobile body vibrates at a predetermined frequency by a predetermined amplitude angle around a reference posture angle corresponding to the reference posture with an axle of left and right wheels of the autonomous mobile body as a rotation axis.

(6)

The information processing device according to (4) or (5), wherein
the operation controller
controls a forward traveling motion of the autonomous mobile body, and controls a posture operation of the autonomous mobile body so that the autonomous mobile body vibrates at a first frequency by a first amplitude angle around a reference posture angle corresponding to the reference posture with an axle of left and right wheels of the autonomous mobile body as a rotation axis when an emotion of the autonomous mobile body corresponds to joy, and
controls a posture operation of the autonomous mobile body so that the autonomous mobile body vibrates at a frequency smaller than the first frequency by an amplitude angle larger than the first amplitude angle around a reference posture angle corresponding to the reference posture with the axle of the left and right wheels of the autonomous mobile body as the rotation axis when an emotion of the autonomous mobile body corresponds to fun.

(7)

The information processing device according to (4) or (5), wherein
the operation controller
controls a turning motion of the autonomous mobile body, and controls a posture operation of the autonomous mobile body so that the autonomous mobile body vibrates at a second frequency by a second amplitude angle around a reference posture angle corresponding to the reference posture with an axle of left and right wheels of the autonomous mobile body as a rotation axis when an emotion of the autonomous mobile body corresponds to anger, and controls a posture operation of the autonomous mobile body so that the autonomous mobile body vibrates at a frequency smaller than the second frequency by an amplitude angle larger than the second amplitude angle around a reference posture angle corresponding to the reference posture with the axle of the left and right wheels of the autonomous mobile body as the rotation axis when an emotion of the autonomous mobile body corresponds to sadness.

(8)

The information processing device according to (4) or (5), wherein the operation controller controls a forward traveling motion of the autonomous mobile body, and controls a posture operation of the autonomous mobile body so that after a predetermined time has passed since the autonomous mobile body rotated in a traveling direction by a third amplitude angle around a reference posture angle corresponding to the reference posture with an axle of left and right wheels of the autonomous mobile body as a rotation axis before the autonomous mobile body reaches a target position, the autonomous mobile body rotates in a direction opposite to the traveling direction by an angle larger than the third amplitude angle around a reference posture angle corresponding to the reference posture with the axle of the left and right wheels of the autonomous mobile body as the rotation axis when an emotion of the autonomous mobile body corresponds to confusion.

(9)

The information processing device according to (4) or (5), wherein the operation controller controls a forward traveling motion of the autonomous mobile body, and controls a posture operation of the autonomous mobile body so as to alternately perform control of causing the autonomous mobile body to advance with the other side of the autonomous mobile body advancing farther than one side of the autonomous mobile body in the left and right direction and control of causing the autonomous mobile body to advance with one side of the autonomous mobile body advancing farther than the other side of the autonomous mobile body in the left and right direction when an emotion of the autonomous mobile body corresponds to deterioration.

(10)

The information processing device according to (9), wherein the operation controller controls a posture operation of the autonomous mobile body by alternately and periodically temporally changing a rotation angle or a rotation angular velocity of the left and right wheels of the autonomous mobile body.

(11)

The information processing device according to any of (1) to (10), wherein the operation controller controls a posture operation of the autonomous mobile body based on user information related to a user, of the autonomous mobile body, located around the autonomous mobile body.

(12)

The information processing device according to (11), wherein the operation controller controls a posture operation of the autonomous mobile body based on, as the user information, image information indicating a face of the user, interactive information indicating a content of an interaction with the user, or contact information indicating a manner of contact of the user with the autonomous mobile body.

(13)

The information processing device according to any of (1) to (12), wherein the operation controller controls a posture operation of the autonomous mobile body based on state information indicating an internal state of the autonomous mobile body.

(14)

The information processing device according to (13), wherein the operation controller controls a posture operation of the autonomous mobile body based on, as the state information, temperature information indicating a temperature in a body of the autonomous mobile body or information indicating a remaining battery level of the autonomous mobile body.

(15)

The information processing device according to any of (1) to (14), wherein the operation controller controls a posture operation of the autonomous mobile body so that a reference posture in the inverted state is a frontward tilting posture.

(16)

An information processing method for executing processing to:

control a moving operation of an autonomous mobile body that travels while maintaining an inverted state, and control a posture operation of the autonomous mobile body that temporally changes from a reference posture in the inverted state.

(17)

An information processing program for causing a computer to execute an operation control procedure to:

control a moving operation of an autonomous mobile body that travels while maintaining an inverted state, and control a posture operation of the autonomous mobile body that temporally changes from a reference posture in the inverted state.

REFERENCE SIGNS LIST

1 INFORMATION PROCESSING SYSTEM
N NETWORK
10 AUTONOMOUS MOBILE BODY
110 SENSOR UNIT
120 INPUT UNIT
130 LIGHT SOURCE
140 AUDIO OUTPUT UNIT
150 DRIVE UNIT
160 STORAGE UNIT
161 ACTION STORAGE UNIT
162 MOTION DATA STORAGE UNIT
170 CONTROLLER
171 DETECTION UNIT
172 RECOGNITION UNIT
173 ACTION PLANNING UNIT
174 ACQUISITION UNIT
175 OPERATION CONTROLLER
180 COMMUNICATION UNIT

The invention claimed is:

1. An information processing device, comprising:
   a controller configured to:
   control a moving operation of an autonomous mobile body that travels in an inverted state; and
   control a posture operation of the autonomous mobile body to temporally change a posture of the autonomous mobile body from a reference posture in the inverted state, wherein
   the posture operation corresponds to a specific operation to vibrate the autonomous mobile body with respect to a reference posture angle,
   the reference posture angle corresponds to the reference posture, and
   an axle of each of a left wheel and a right wheel of the autonomous mobile body is a rotation axis of the specific operation to vibrate the autonomous mobile body.

2. The information processing device according to claim 1, wherein the controller is further configured to:
   acquire motion data corresponding to the posture operation of the autonomous mobile body; and
   control the posture operation of the autonomous mobile body based on the acquired motion data.

3. The information processing device according to claim 2, wherein the controller is further configured to:
   acquire the motion data based on an emotion of the autonomous mobile body; and
   control the posture operation of the autonomous mobile body based on the acquired motion data corresponding to the emotion.

4. The information processing device according to claim 2, wherein the autonomous mobile body includes:
   the right wheel on a right side with respect to a traveling direction of the autonomous mobile body, and
   the left wheel on a left side with respect to the traveling direction of the autonomous mobile body.

5. The information processing device according to claim 4, wherein the controller is further configured to:
   control the moving operation of the autonomous mobile body, wherein the moving operation includes at least one of a front-back motion, a turning motion, or a rotation motion; and
   control the posture operation to vibrate the autonomous mobile body at a specific frequency by a specific amplitude angle with respect to the reference posture angle.

6. The information processing device according to claim 4, wherein the controller is further configured to:
   control a forward traveling motion of the autonomous mobile body;
   control, based on a determination that a first emotion of the autonomous mobile body corresponds to joy, the posture operation to vibrate the autonomous mobile body at a first frequency by a first amplitude angle with respect to the reference posture angle; and
   control, based on a determination that a fourth emotion of the autonomous mobile body corresponds to fun, the posture operation to vibrate the autonomous mobile body at a fourth frequency by a fourth amplitude angle with respect to the reference posture angle, wherein
   the fourth frequency is smaller than the first frequency, and
   the fourth amplitude angle is larger than the first amplitude angle.

7. The information processing device according to claim 4, wherein the controller is further configured to:
   control a turning motion of the autonomous mobile body;
   control, based on a determination that a second emotion of the autonomous mobile body corresponds to anger, the posture operation to vibrate the autonomous mobile body at a second frequency by a second amplitude angle with respect to the reference posture angle; and
   control, based on a determination that a second fifth emotion of the autonomous mobile body corresponds to sadness, the posture operation to vibrate the autonomous mobile body at a fifth frequency by a fifth amplitude angle with respect to the reference posture angle, wherein
   the fifth frequency is larger than the second frequency, and
   the fifth amplitude angle is smaller than the second amplitude angle.

8. The information processing device according to claim 4, wherein the controller is further configured to:
   control a forward traveling motion of the autonomous mobile body;
   rotate, before the autonomous mobile body reaches a target position, the autonomous mobile body in the travelling direction by a third amplitude angle with respect to the reference posture angle; and
   control, after a specific time from the rotation of the autonomous mobile body, the posture operation to rotate the autonomous mobile body in a specific direction by a sixth amplitude angle with respect to the reference posture angle, wherein
   the control of the posture operation is based on a determination that an emotion of the autonomous mobile body corresponds to confusion,
   the specific direction is opposite to the traveling direction, and
   the sixth amplitude angle is larger than the third amplitude angle.

9. The information processing device according to claim 4, wherein the controller is further configured to:
   control a forward traveling motion of the autonomous mobile body; and
   control, based on a determination that a seventh emotion of the autonomous mobile body corresponds to deterioration, the posture operation to alternately perform a first operation and a second operation, wherein
   the first operation includes control of the autonomous mobile body to advance in a first side of the right side or the left side of the autonomous mobile body, and
   the second operation includes control of the autonomous mobile body to advance, farther from the first side, in a second side of the right side or the left side of the autonomous mobile body.

10. The information processing device according to claim 9, wherein
    the posture operation of the autonomous mobile body includes an alternate change and a periodical change in one of a rotation angle or a rotation angular velocity of the left wheel and the right wheel of the autonomous mobile body, and
    the alternate change and the periodical change in one of the rotation angle or the rotation angular velocity is temporary.

11. The information processing device according to claim 1, wherein the controller is further configured to:
    control the posture operation of the autonomous mobile body based on user information corresponding to a user of the autonomous mobile body, and
    the user is in a vicinity of the autonomous mobile body.

12. The information processing device according to claim 11, wherein the user information includes at least one of
image information that indicates a face of the user,
interactive information that indicates a content of an interaction with the user, or
contact information that indicates a manner of contact of the user with the autonomous mobile body.

13. The information processing device according to claim 1, wherein the controller is further configured to:
control the posture operation of the autonomous mobile body based on state information that indicates an internal state of the autonomous mobile body.

14. The information processing device according to claim 13, wherein the state information includes at least one of
temperature information that indicates a temperature in a body of the autonomous mobile body, or
information that indicates a remaining battery level of the autonomous mobile body.

15. The information processing device according to claim 1, wherein the controller is further configured to:
control the posture operation of the autonomous mobile body to maintain the reference posture in the inverted state as a frontward tilting posture.

16. An information processing method, comprising:
controlling, by a controller, a moving operation of an autonomous mobile body that travels in an inverted state; and
controlling, by the controller, a posture operation of the autonomous mobile body to temporally change a posture of the autonomous mobile body from a reference posture in the inverted state, wherein
the posture operation corresponds to a specific operation to vibrate the autonomous mobile body with respect to a reference posture angle,
the reference posture angle corresponds to the reference posture, and
an axle of each of a left wheel and a right wheel of the autonomous mobile body is a rotation axis of the specific operation to vibrate the autonomous mobile body.

17. A non-transitory computer-readable medium having stored thereon, computer-executable instructions which, when executed by a computer, cause the computer to execute operations, the operations comprising:
controlling a moving operation of an autonomous mobile body that travels in an inverted state; and
controlling a posture operation of the autonomous mobile body to temporally change a posture of the autonomous mobile body from a reference posture in the inverted state, wherein
the posture operation corresponds to a specific operation to vibrate the autonomous mobile body with respect to a reference posture angle
the reference posture angle corresponds to the reference posture, and
an axle of each of a left wheel and a right wheel of the autonomous mobile body is a rotation axis of the specific operation to vibrate the autonomous mobile body.

* * * * *